(12) United States Patent
Nakamura

(10) Patent No.: US 10,564,436 B2
(45) Date of Patent: Feb. 18, 2020

(54) PROJECTING APPARATUS, PROJECTING MODULE, AND ELECTRONIC INSTRUMENT

(71) Applicant: Sony Corporation, Tokyo (JP)

(72) Inventor: Masashi Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 45 days.

(21) Appl. No.: 15/578,037

(22) PCT Filed: Jun. 3, 2016

(86) PCT No.: PCT/JP2016/066571
§ 371 (c)(1),
(2) Date: Nov. 29, 2017

(87) PCT Pub. No.: WO2016/203991
PCT Pub. Date: Dec. 22, 2016

(65) Prior Publication Data
US 2018/0143446 A1    May 24, 2018

(30) Foreign Application Priority Data

Jun. 19, 2015 (JP) .................................. 2015-124107

(51) Int. Cl.
| | | |
|---|---|---|
| H04N 9/31 | (2006.01) |
| G02B 27/18 | (2006.01) |
| G03B 21/00 | (2006.01) |
| G03B 21/20 | (2006.01) |

(52) U.S. Cl.
CPC ........... *G02B 27/18* (2013.01); *G03B 21/008* (2013.01); *G03B 21/2033* (2013.01); *H04N 9/3129* (2013.01)

(58) Field of Classification Search
CPC ...... H04N 9/31; H04N 9/3129; H04N 9/3194; H04N 9/3188; H04N 9/3164; G02B 27/18; G02B 27/1006; G02B 26/0833; G02B 26/105; G02B 26/101; G03B 21/2033; G03B 21/008; G09G 5/026; G09G 3/006; G09G 3/025; G09G 3/02; G09G 2360/16; G09G 2330/12; G09G 2320/0242
See application file for complete search history.

(56) References Cited

U.S. PATENT DOCUMENTS

2007/0206258 A1* 9/2007 Malyak ................ G02B 26/105
                                                    345/204
2016/0191870 A1* 6/2016 Hajjar .................... G02B 26/12
                                                    353/31

FOREIGN PATENT DOCUMENTS

| JP | 2003-021800 A | 1/2003 |
| JP | 2007-047243 A | 2/2007 |
| JP | 2007-121382 A | 5/2007 |

(Continued)

*Primary Examiner* — Cara E Rakowski
*Assistant Examiner* — Danell L Owens
(74) *Attorney, Agent, or Firm* — Michael Best & Friedrich LLP

(57) ABSTRACT

The present technology relates to a projecting apparatus, a projecting module, and an electronic instrument capable of achieving high definition in an image projected by the projection apparatus.
With two or more systems of laser beams projected from a light source to a drive mirror formed with MEM in a projection apparatus, the resolution is to be enhanced without changing a drive speed of the drive mirror by the MEM. The present technology can be applied to a projection apparatus.

15 Claims, 29 Drawing Sheets

(56) References Cited

FOREIGN PATENT DOCUMENTS

| | | |
|---|---|---|
| JP | 2007-121802 A | 5/2007 |
| JP | 2014-071244 A | 4/2014 |
| JP | 2014-095787 A | 5/2014 |

\* cited by examiner

PROJECTING APPARATUS, PROJECTING MODULE, AND ELECTRONIC INSTRUMENT

TECHNICAL FIELD

The present technology relates to a projecting apparatus, a projecting module, and an electronic instrument, and particularly relates to a projecting apparatus, a projecting module, and an electronic instrument capable of achieving high image quality in an image projected by the projection apparatus.

BACKGROUND ART

Conventionally, for example, there is a projection apparatus that performs scanning using reciprocating operation of a laser beam sinusoidally toward a screen as a target (refer to, for example, Patent Document 1).

With this projection apparatus, a drive mirror that reflects the laser beam is driven to allow the laser beam reflected from the drive mirror to be emitted to each of positions on a screen.

This causes a spot light ray, that is, spot-shaped light, to be projected on each of the positions on the screen by the emission of the laser beam. That is, an image having a plurality of spot light rays as pixels is projected on the screen.

Meanwhile, since the laser beam is scanned at a scanning speed corresponding to a resonance frequency of the drive mirror, the highest scanning speed is obtained at a center of the screen, with the speed decreasing toward the end of the screen. Moreover, the conventional projection apparatus emits a laser beam at predetermined intervals.

This causes the spot light rays to become closer to each other toward the end of the screen, and causes the width of the spot light rays to become wider.

With this configuration, according to the conventional projection apparatus, the spot light rays are closer to each other toward the end of the screen, with the width of the spot light rays being wider as described above, leading to generation of interference between the spot light rays on the screen.

This results in deterioration of the image quality of the image projected on the screen due to the interference between the spot light rays.

To cope with this, a technology for enhancing the image quality of the image projected on the screen by reducing the interference between the spot light rays has been proposed (refer to Patent Document 2).

CITATION LIST

Patent Document

Patent Document 1: Japanese Patent Application Laid-Open No. 2003-021800
Patent Document 2: Japanese Patent Application Laid-Open No. 2014-071244

SUMMARY OF THE INVENTION

Problems to be Solved by the Invention

Meanwhile, in determining the resolution of the projection apparatus using the technologies of Patent Documents 1 and 2, a scanning speed of the drive mirror works as a bottleneck.

Accordingly, in order to realize a resolution exceeding a projection image realized by the current scanning speed of the drive mirror, there is a need to further increase the scanning speed of the drive mirror.

There is a limitation, however, in the scanning speed of the drive mirror, leading to a limitation in the resolution of an image projected by a projection apparatus with the scanning speed of the drive mirror as a bottleneck.

Moreover, the projection apparatus using the technologies of Patent Documents 1 and 2 has a problem of generating color bleeding due to the shifts of individual optical axes of RGB light sources.

The present technology has been made in view of such a situation, and is intended, in particular, to achieve high image quality in an image projected by the projection apparatus.

Solutions to Problems

A projecting apparatus according to an aspect of the present technology is a projecting apparatus including: a light source unit including a plurality of light sources each configured to generate a laser beam; and a scanning section configured to reflect the plurality of laser beams generated by the plurality of light sources of the light source unit and project the plurality of laser beams on a screen while scanning the laser beams, in which the plurality of light sources is provided in a shifted state so as to allow the laser beams generated by the plurality of light sources to form different scanning light paths on a screen, and the shifted laser beams are modulated with different image signals.

The scanning section is caused to reflect a plurality of laser beams generated by the light source and is caused to scan over the screen in a vertical direction by raster scan, and in a case where the number of the plurality of light sources is N, and when the plurality of light sources allows a plurality of laser beams generated in each of the light sources to be reflected by the scanning section to be projected on the screen, the laser beam is projected in a state of being shifted by (m+1/N) lines in a vertical direction on the screen, and in a case where the number of the light sources is one and the number of lines in the horizontal direction capable of scanning over the screen is Vline_single, the m can be set to be smaller than Vline_single×(1−1/N).

The light source unit may include: a plurality of laser beam generators configured to generate a laser beam and a collimator lens configured to substantially collimate the plurality of laser beams generated by the plurality of laser beam generators; and an optical block configured to project the plurality of laser beams reflected by the scanning section and scanned, on the screen, in which, when an shift amount of an optical axis of the laser beams of the plurality of laser beam generators is d, an optical magnification by the optical block and the collimator lens is Mt, and a line interval in the vertical direction when N laser beams of a same color are scanned over the screen is Vline_step, then, it is possible to set: d=(m+1/N)/Mt×Vline_step.

The plurality of light sources may be arranged to have a shift of the plurality of light sources being fixed such that a plurality of laser beam is shifted by 1/N times when the plurality of laser beams generated by the plurality of light sources is reflected by the scanning section and projected on the screen, with respect to the line interval in the vertical direction when the same laser beams are scanned over the screen.

The plurality of light sources may be monolithic multibeam laser diodes (LD).

The light source unit may be provided for each of RGB in the image signal.

A projecting module according to an aspect of the present technology is a projecting module including: a light source unit including a plurality of light sources each configured to generate a laser beam; and a scanning section configured to reflect the plurality of laser beams generated by the plurality of light sources and project the plurality of laser beams on a screen while scanning the laser beams, in which the plurality of light sources is provided in a shifted state so as to allow the laser beams generated by the plurality of light sources to form different scanning light paths on a screen, and the shifted laser beams are modulated with different image signals.

An electronic instrument according to an aspect of the present technology is an electronic instrument including: a light source unit including a plurality of light sources each configured to generate a laser beam; and a scanning section configured to reflect the plurality of laser beams generated by the plurality of light sources of the light source unit and project the plurality of laser beams on a screen while scanning the laser beams, in which the plurality of light sources is provided in a shifted state so as to allow the laser beams generated by the plurality of light sources to form different scanning light paths on a screen, and the shifted laser beams are modulated with different image signals.

According to an aspect of the present technology, a laser beam is generated by a light source unit including a plurality of light sources, a plurality of laser beams generated by the plurality of light sources of the light source unit is reflected and projected on a screen while being scanned, by a scanning section, the plurality of light sources is provided in a shifted state so as to allow the laser beams generated by the plurality of light sources to form different scanning light paths on the screen, and the individually shifted laser beams are modulated with individually different image signals.

A projecting apparatus according to one aspect of the present technology may be a separate apparatus or a block that functions as a projecting apparatus.

EFFECTS OF THE INVENTION

According to one aspect of the present technology, it is possible to achieve high image quality in the image projected by the projection apparatus.

MODE FOR CARRYING OUT THE INVENTION

<Exemplary Configuration of Projection System>

Figure 1:
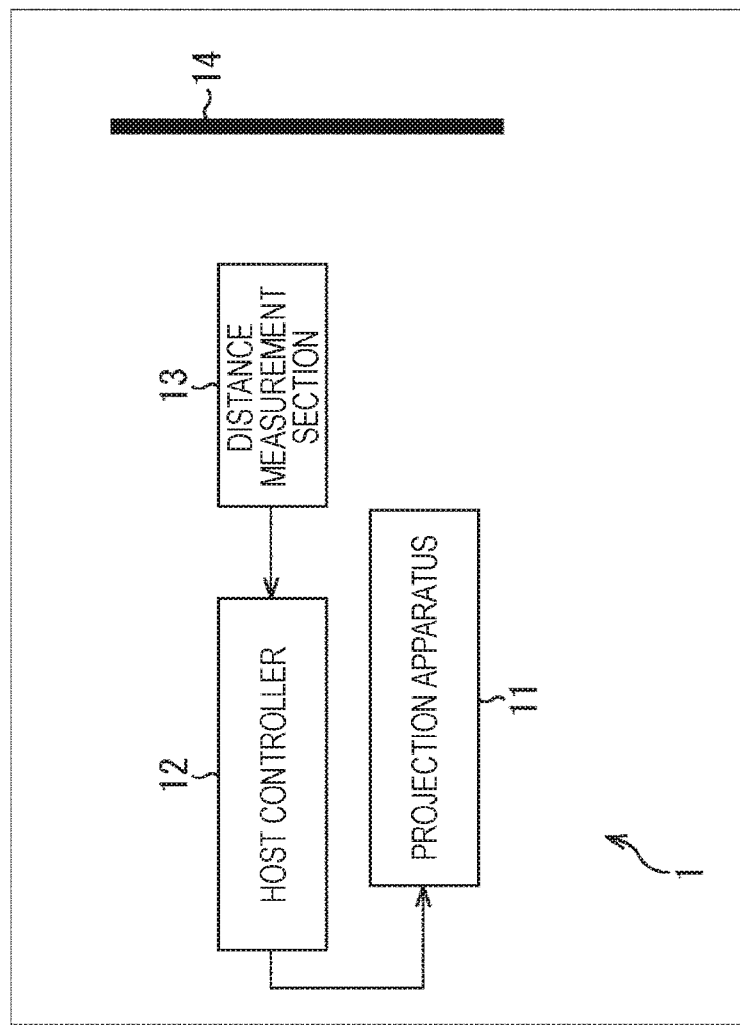
FIG. 1 is a block diagram illustrating an exemplary configuration of a projection system according to the present technology.

FIG. 1 illustrates an exemplary configuration of a projection system 1 according to the present technology.

The projection system 1 includes a projection apparatus 11, a host controller 12, a distance measurement section 13, and a screen 14.

Note that the projection system 1 is configured to suppress interference between spot light rays as the spot-like light beams projected as pixels at the individual positions on the screen 14, thereby enhancing the image quality of the projection image projected on the screen 14.

Specifically, the projection apparatus 11 suppresses the interference between the spot light rays on the screen 14 by controlling emission of laser beams on the basis of a distance to the screen 14, the position on the screen 14 on which the spot light ray is projected, for example.

Note that it is known that the shorter the distance to the screen 14 and the closer to the end the position on the screen 14 on which the spot light ray is projected, the more likely the interference between the spot light rays on the screen 14 occurs. Note that the interference between the spot light rays will be described in detail with reference to FIG. 6.

The host controller 12 project a projection image having a spot light ray on the screen 14 as each of pixels by emitting a laser beam on the screen 14 by controlling the projection apparatus 11.

Moreover, the host controller 12 supplies a distance (information indicating a distance) to the screen 14 (hereinafter also referred to simply as a screen distance) supplied from the distance measurement section 13, to the projection apparatus 11.

In the projection apparatus 11, the screen distance (distance to the screen 14) supplied from the host controller 12 is referred to at the time of controlling the laser beam emission.

The distance measurement section 13 measures the screen distance and supplies a measurement result to the host controller 12.

Note that the distance measurement section 13 is supposed to be provided near an emission port for emitting the laser beam, of the projection apparatus 11. Accordingly, the screen distance is the distance from the emission port of the projection apparatus 11 to the screen 14.

In addition, the distance measurement section 13 may have any configuration as long as it can measure the screen distance, and its measuring method is not limited.

That is, for example, it would be possible to measure the screen distance by adopting a laser range finder as the distance measurement section 13 and measuring the time from the emission of the laser light to the detection of the reflected light.

In addition, for example, it is also allowable to measure the screen distance by adopting a plurality of cameras as the distance measurement section 13 and by executing stereo processing of measuring the distance on the basis of the parallax between the cameras using captured images obtained by imaging by the plurality of cameras.

Note that the distance measurement section 13 may be incorporated in the projection apparatus 11, for example.

The screen 14 projects a projection image by a laser beam emitted from the projection apparatus 11, having a spot light ray corresponding to the laser beam as a pixel.

<Suppression of Interference Between Spot Light Rays>

Next, an exemplary case where the projection apparatus 11 suppresses the interference between the spot light rays by controlling the emission of the laser beam will be described with reference to FIG. 2.

Figure 2:
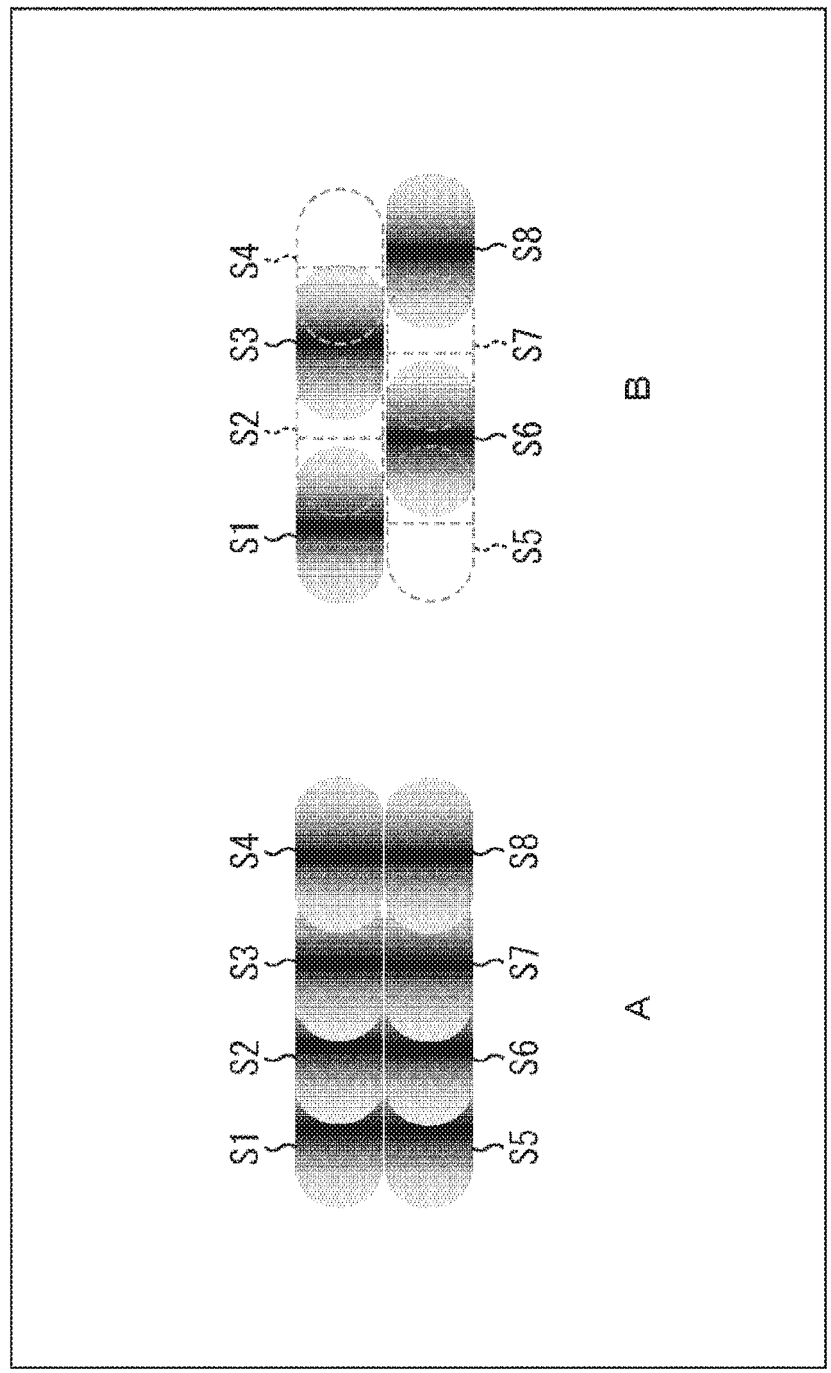
FIG. 2 is a diagram illustrating an example of suppressing interference between spot light rays.

A of FIG. 2 illustrates an example of a plurality of spot light rays S1 to S8 projected on the screen 14 at mutually different timings.

B of FIG. 2 illustrates an example when solely the spot light rays S1, S3, S6, and S8 not overlapping with each other among the spot light rays S1 to S8 are projected.

As illustrated in A of FIG. 2, for example, since a portion of the spot light ray S1 overlaps with a portion of the spot light ray S2 adjacent on the right side in the drawing, light interference is generated between the spot light ray S1 and the spot light ray S2.

Similarly, light interference is generated between the spot light ray S2 and the spot light ray S3, between the spot light ray S3 and the spot light ray S4, between the spot light ray S5 and the spot light ray S6, between the spot light ray S6 and the spot light ray S7, and between the spot light ray S7 and the spot light ray S8, respectively.

To cope with this, for example, the projection apparatus 11 avoids a situation where the spot light rays interfere with each other by solely emitting the laser beams corresponding to the spot light rays S1, S3, S6, and S8 among the spot light rays S1 to S8.

In this case, solely the spot light rays S1, S3, S6, and S8 are projected on the screen 14 as pixels constituting the projection image, as illustrated in B of FIG. 2.

Figure 3:
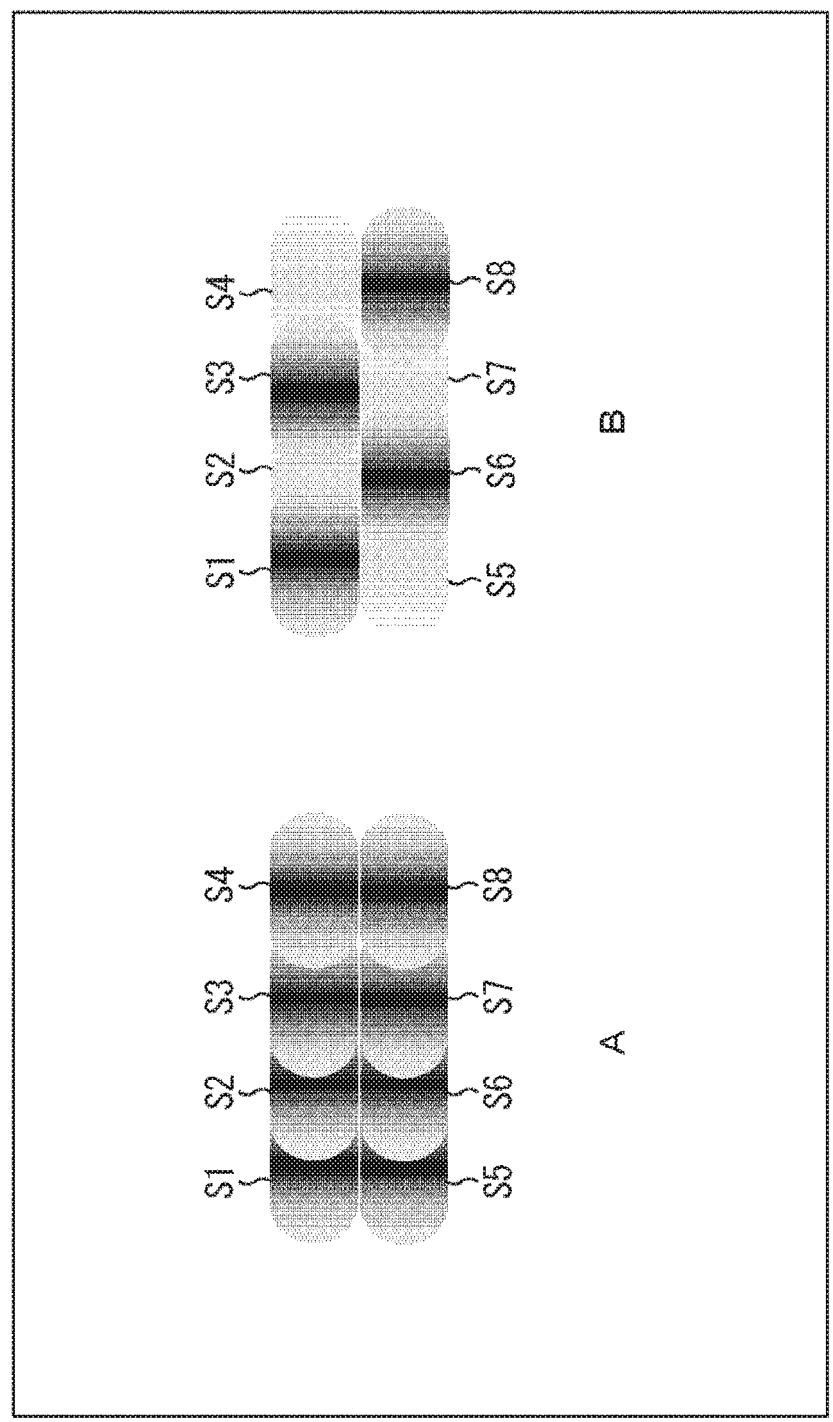
FIG. 3 is a diagram illustrating another example of suppressing interference between spot light rays.

Next, FIG. 3 illustrates another exemplary case where the projection apparatus 11 suppresses the interference between the spot light rays by controlling the emission of the laser beam.

In A of FIG. 3 illustrates an example of a plurality of the spot light rays S1 to S8 projected on the screen 14 at mutually different timings similarly to A of FIG. 2.

In B of FIG. 3, an example of the spot light rays S1, S3, S6, S8 not overlapping with each other and the spot light rays S2, S4, S5, S7 in each of which luminance is adjusted to a level so as not to affect the spot light rays S1, S3, S6, and S8.

In A of FIG. 3, light interference is generated between the spot light ray S1 and the spot light ray S2, between the spot light ray S2 and the spot light ray S3, between the spot light ray S3 and the spot light ray S4, between the spot light ray S5 and the spot light ray S6, between the spot light ray S6 and the spot light ray S7, and between the spot light ray S7 and the spot light ray S8, respectively.

To cope with this, for example, the projection apparatus 11 is configured to avoid a situation where the spot light rays interfere with each other by adjusting the luminance of the spot light rays S2, S4, S5, and S7 to a luminance of a predetermined threshold level or below (for example, adjusting the luminance to 0).

In this case, the spot light rays S1 to S8 are projected on the screen 14 as pixels constituting the projection image, as illustrated in B of FIG. 3.

<Exemplary Configuration of Projection Apparatus 11 According to First Embodiment of Present Technology>

Next, an exemplary configuration of the projection apparatus 11 in FIG. 1 according to the first embodiment of the present technology of FIG. 1 will be described with reference to FIG. 4.

The projection apparatus 11 projects a projection image 14a using a laser beam as a light source on the screen 14.

Furthermore, the projection apparatus 11 includes a controller 21, a laser driver 22, a mirror driver 23, laser light source sections 24R, 24G, and 24B, a mirror 25, dichroic mirrors 26-1 and 26-2, a drive mirror 27 and an optical lens 28.

An input image signal is supplied to the controller 21, for example, as image data of the projection image 14a to be projected on the screen 14 from the host controller 21 in FIG. 1.

The controller 21 generates pixel data of each of colors (red, green, and blue) of the pixels constituting the projection image 14a by interpolation, on the basis of an input image signal supplied from the host controller 12, and supplies the generated image data to the laser driver 22 in synchronization with the mirror synchronization signal obtained from the mirror driver 23. Note that the mirror synchronization signal is a signal for driving the mirror driver 23 in synchronization with an input image signal.

Moreover, a control signal is supplied from the host controller 12 to the controller 21, and the controller 21 performs control in accordance with the control signal.

The laser driver 22 generates a drive signal corresponding to the pixel value of each of the pixels of the projection image 14a on the basis of the pixel data for each of the colors supplied from the controller 21, and supplies the drive signal to the laser light source sections 24R, 24G, and 24B. Specifically, for example, the laser driver 22 supplies a drive signal corresponding to the pixel value of the red pixel data to the laser light source section 24R, and supplies a drive signal corresponding to the pixel value of the green pixel data to the laser light source section 24G, and supplies a drive signal corresponding to the pixel value of the blue pixel data to the laser light source section 24B.

In order to allow the laser beam to be scanned in the horizontal direction (left-right direction in the drawing) and the vertical direction (up-down direction in the drawing) of the screen 14, the mirror driver 23 generates a horizontal scan signal and a vertical scan signal based on a resonance frequency of the drive mirror 27 and supplies the generated signals to the drive mirror 27. Moreover, the mirror driver 23 includes a light receiving section (not illustrated) configured to detect a portion of the laser beam reflected by the drive mirror 27. The mirror driver 23 then adjusts the horizontal scan signal and the vertical scan signal on the basis of a detection result of the light receiving section and feeds back a detection signal according to the detection result of the light receiving section to the controller 21.

The laser light source sections 24R, 24G, and 24B output laser beams of corresponding colors (of corresponding wavelengths) in accordance with the drive signal supplied from the laser driver 22. For example, the laser light source section 24R outputs a red laser beam at a level corresponding to the pixel value of red pixel data. Similarly, the laser light source section 24G outputs a green laser beam at a level corresponding to the pixel value of the green pixel data, and the laser light source section 24B outputs a blue laser beam at a level corresponding to the pixel value of the blue pixel signal.

Note that in the following description, the laser light source sections 24R, 24G, and 24B will be simply referred to as the laser light source section 24 when it is not necessary to distinguish between each other.

The mirror 25 reflects the red laser beam output from the laser light source section 24R. The dichroic mirror 26-1 reflects the green laser beam output from the laser light source section 24G and transmits the red laser beam reflected by the mirror 25. The dichroic mirror 26-2 reflects the blue laser beam output from the laser light source section 24B and transmits the red laser beam reflected by the mirror 25 and the green laser beam reflected by the dichroic mirror 26-1.

Note that the mirrors 25 and the dichroic mirrors 26-1 and 26-2 are arranged in combination with each other so as to enable the optical axes of the laser beams output from the laser light source sections 24R, 24G, and 24B to be coaxial.

The drive mirror 27 is a microscopic mirror formed by microelectro-mechanical systems (MEMS), for example, and is driven in accordance with the horizontal scan signal and the vertical scan signal supplied from the mirror driver 23. Specifically, for example, the drive mirror 27 is driven to reflect the laser beam output from each of the laser light source sections 24R, 24G, and 24B, so as to allow each of the laser beams to be scanned on the screen 14 in the horizontal direction and the vertical direction.

The optical lens 28 is arranged on an optical path of the laser beam directed from the drive mirror 27 to the screen 14, and corrects the optical path of the laser beam.

Note that the projection apparatus 11 may employ a configuration in which the laser driver 22 and the mirror driver 23 are integrated in the controller 21. Moreover, the projection apparatus 11 may be configured such that the optical lens 28 is not arranged on the optical path of the laser beam.

In this manner, the projection apparatus 11 drives the drive mirror 27 to scan the laser beam, thereby projecting the two-dimensional projection image 14a on the screen 14. Furthermore, among the methods for scanning the laser beam by the drive mirror 27 including a method called a raster scan and a method called a Lissajous scan, for example, the projection apparatus 11 employs, for example, the raster scan.

<Raster Scan>

The raster scan will be described with reference to FIG. 5.

Figure 5:
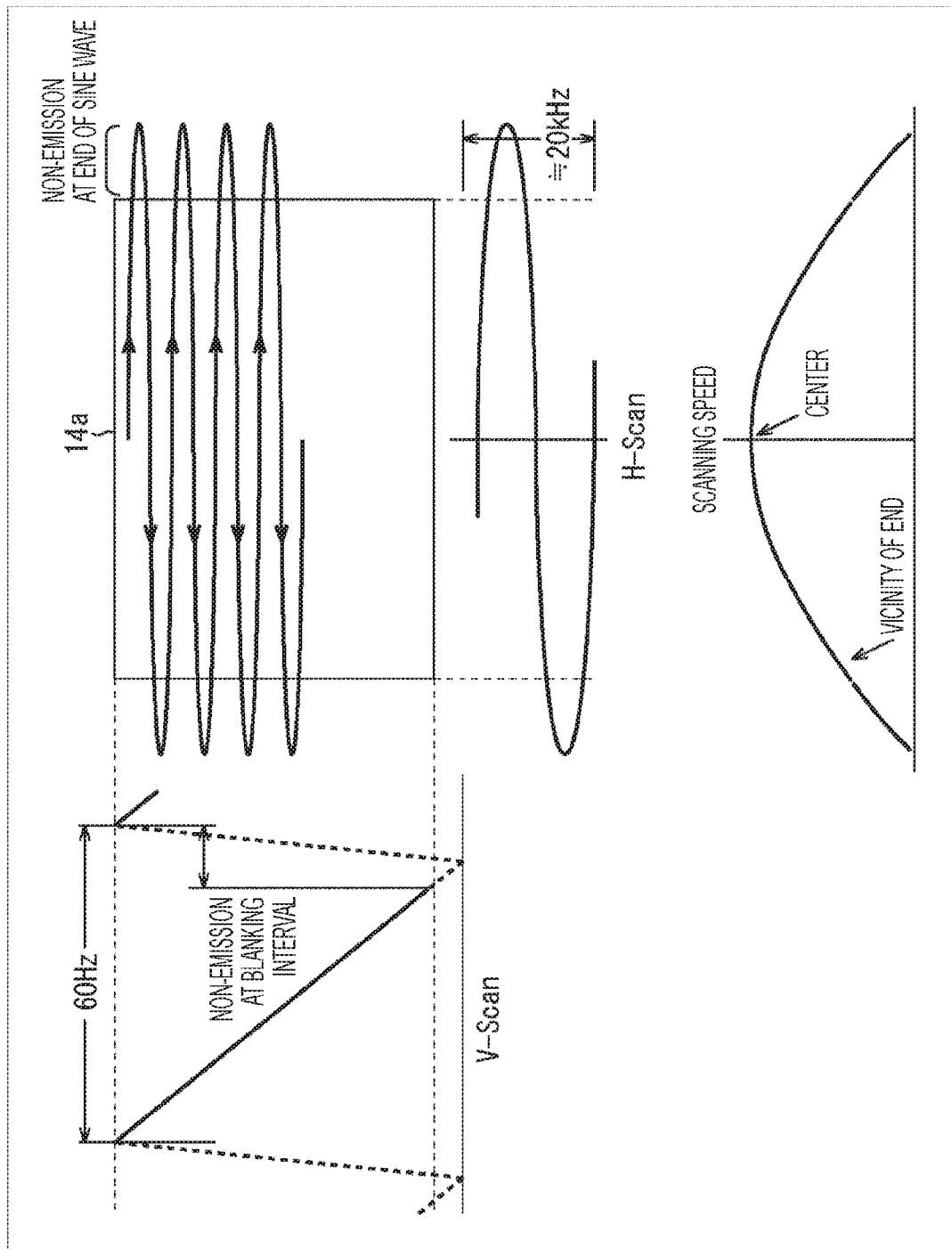
FIG. 5 is a diagram for illustrating raster scan.

FIG. 5 illustrates a scanning trajectory of a laser beam by the raster scan on the projection image 14a. In this, a horizontal scan signal H-Scan is illustrated below the projection image 14a, and a vertical scan signal V-Scan is illustrated on the left side of the projection image 14a.

The horizontal scan signal H-Scan is, for example, a signal having a sinusoidal waveform that oscillates at about 20 kHz corresponding to the resonance frequency of the drive mirror 27, and the frequency of the horizontal scan signal H-Scan is ½ of the horizontal synchronization frequency of the projection image 14a. The vertical scan signal V-Scan is, for example, a signal having a sawtooth-shaped waveform oscillating at a frequency 60 Hz as a frequency corresponding to the frame period of the projection image 14a.

Note that it is possible to set the laser beam to non-emission in the scanning trajectory in the vicinity of both ends of the horizontal scan signal H-Scan, and to disable a turnaround portion of the scanning trajectory for projecting the projection image 14a. Moreover, the laser beam is set to non-emission in an interval in which the vertical scan signal V-Scan has a waveform rising substantially vertically, that is, in a blanking interval in which the scanning trajectory of the laser beam sharply changes from a lower end (position at the end of scanning) toward an upper end (position at the start of next scan).

The drive mirror 27 is driven in accordance with the horizontal scan signal H-Scan and the vertical scan signal V-Scan, the laser beam is scanned with the scanning trajectory as illustrated in the projection image 14a. As illustrated in the figure, the laser beam is scanned in both directions.

That is, the scanning direction of the laser beam is reversed row by row in the scanning lines running in the horizontal direction. This generates a need for the projection apparatus 11 to rearrange input image signals and change the data access direction with respect to the input image signals row by row in the scanning lines.

Furthermore, as illustrated below the horizontal scan signal H-Scan in FIG. 5, the scanning speed of the laser beam increases at a center of the projection image 14a, while decreasing in the vicinity of an end of the projection image 14a. Since it is anticipated that this would generate uneven luminance in the projection image 14a, the projection apparatus 11 performs adjustment so as to achieve uniform luminance by decreasing the output of the laser beam in the vicinity of the end of the projection image 14a. Similarly, the projection apparatus 11 may adjust the rate of the input image signal as necessary.

Furthermore, since the laser beam is scanned in accordance with a sine wave, the intervals between the scanning lines running in the horizontal direction become non-uniform. By typical image signal standards, an image is formed by a pixel array in which pixels are arranged in a lattice pattern, and accordingly, outputting an input image signal conforming to the image signal standard in accordance with a scanning trajectory of a laser beam according to a sine wave would result in misalignment in individual pixels in the projection image 14a. Note that while FIG. 4 illustrates a case of the projection apparatus 11 having one drive mirror 27, it is also possible to provide drive mirrors for individually scanning the scanning orbits in the horizontal direction and the vertical direction.

<Relationship between Laser Beam Scan Trajectory and Pixel Array According to Image Signal Standard>

A relationship between a scanning trajectory of a laser beam and a pixel array according to an image signal standard will be described with reference to FIG. 6.

Figure 6:
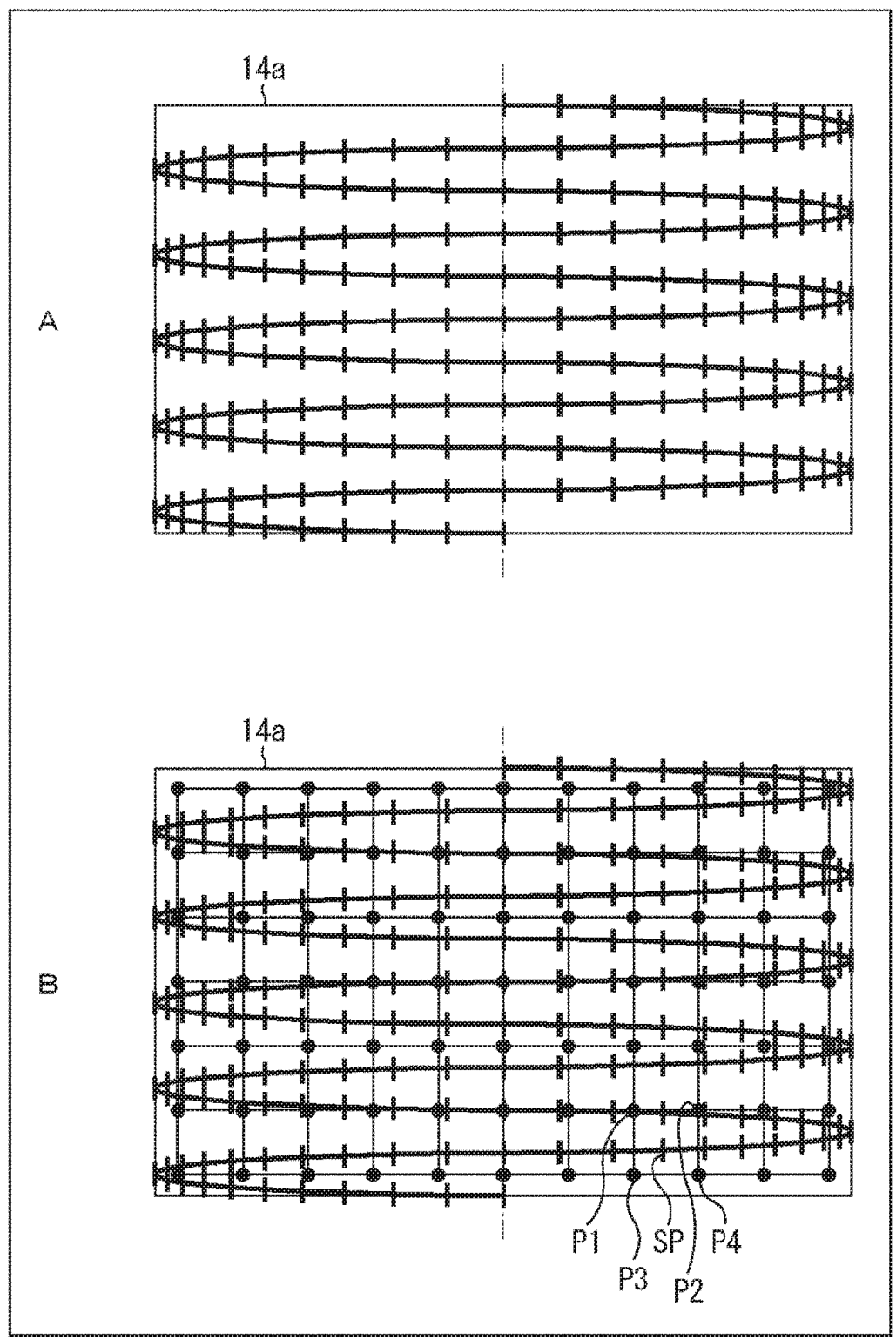
FIG. 6 is a diagram for illustrating a relationship between a scanning trajectory of a laser beam and a pixel array according to an image signal standard.

A of FIG. 6 illustrates a scanning trajectory of a laser beam, and B of FIG. 6 illustrates a state in which the scanning trajectory of the laser beam and the pixel array conforming to the image signal standard are superimposed on each other. Note that A and B of FIG. 6 illustrate an exemplary case where the turnaround portion of the scanning trajectory is used for projecting the projection image 14a.

In A and B of FIG. 6, rectangular dots arranged at a predetermined pitch on the scanning trajectory of the laser beam represent spot positions divided with by a video clock synchronized with the horizontal scan signal H-Scan with respect to the orbit of the sinusoidal horizontal scan signal H-Scan. That is, the spot positions indicate the positions where the laser beam is emitted at different timings according to the video clock, and where the spot light ray is projected.

As described above with reference to FIG. 5, the scanning speed of the laser beam increases at the center of the projection image 14a (screen 14), while decreasing in the vicinity of the end of the projection image 14a, with the intervals between the scanning lines running in the horizontal direction becoming non-uniform. Therefore, as illustrated in A of FIG. 6, the density of the spot positions on the screen 14 is low (rougher) at the center of the projection image 14a, while becoming higher (finer) in more vicinity of the end, and at the same time, the intervals of the spot positions in the vertical direction becomes non-uniform.

Moreover, in B of FIG. 6, round dots arranged in a lattice pattern represent pixels arranged in a pixel array conforming to the image signal standard. As illustrated in B of FIG. 6, the position of the spots according to the scanning trajectory of the laser beam is greatly different from the arrangement of the pixels according to the image signal standard, which is also non-uniform in terms of timing. For this reason, misalignment occurs for each of the pixels at the time of projection of the projection image 14a.

To cope with this, the projection apparatus 11 is configured to define pixels constituting the image data supplied as the input image signal as reference pixels and perform interpolation processing of interpolating projection pixels projected to the spot positions from the reference pixels (or the pixel value of the reference pixels). This makes it possible to avoid occurrence of misalignment in each of the pixels in the projection image 14a.

For example, a spot position SP illustrated in B of FIG. 6 will be described. The projection apparatus 11 performs interpolation processing of generating a pixel value of a projection pixel projected to the spot position SP from the pixel values of the four reference pixels P1 to P4 in the vicinity of the spot position SP by performing two-dimensional interpolation according to the spot position SP. By performing interpolation processing like this for all the spot positions, it is possible to avoid the generation of misalignment in each of the pixels in the projection image 14a.

Note that the pattern of selecting the reference pixel referred to at the time of interpolation of the projection pixel is not limited to the pattern of selecting the four reference pixels P1 to P4 as illustrated in B of FIG. 6, but various patterns are possible, including a pattern of selecting more reference pixels.

<Resolution>

Figure 7:
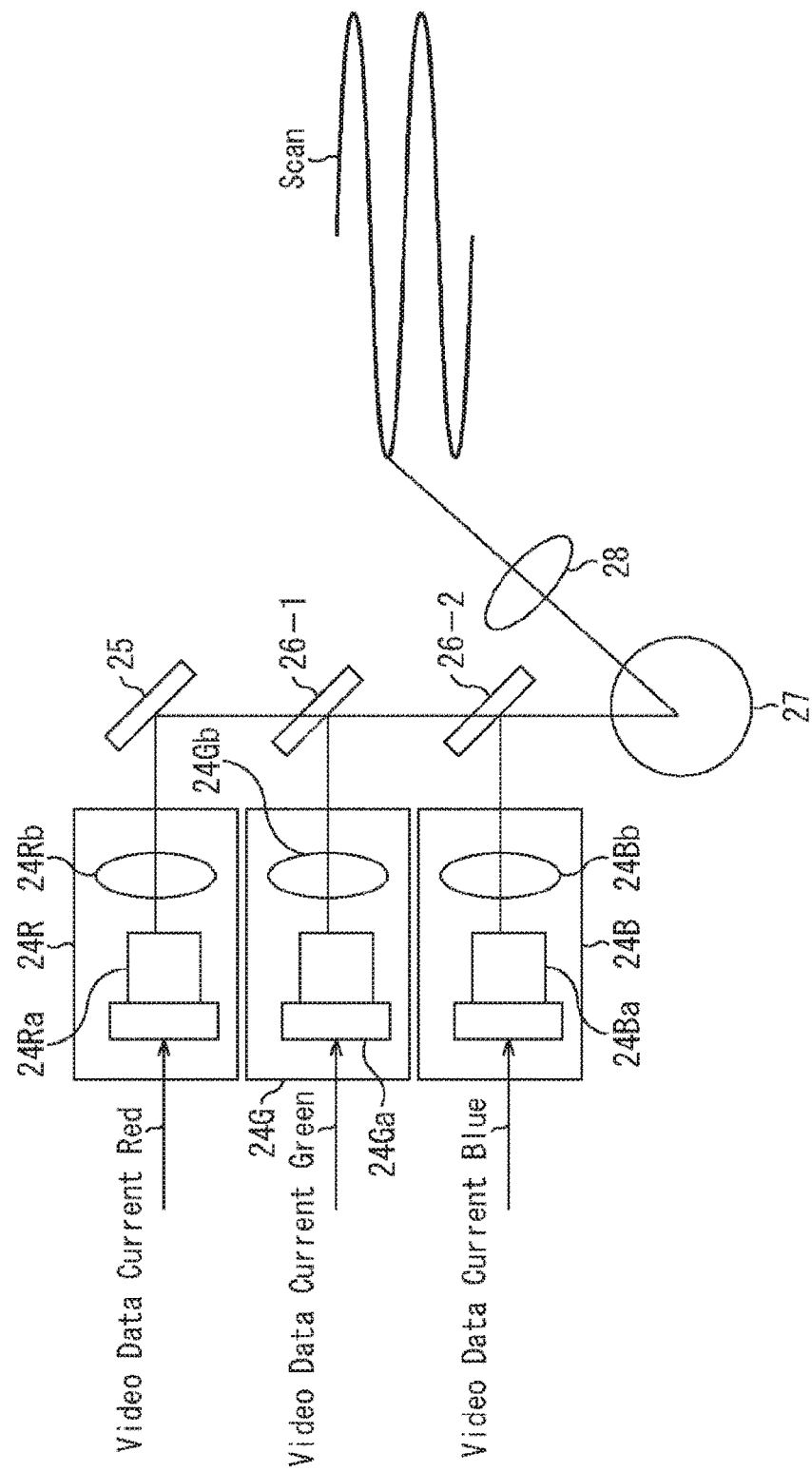
FIG. 7 is a diagram illustrating a configuration around laser light source sections 24R, 24G, and 24B in a general projection apparatus.

Next, before describing the resolution in the projection apparatus 11 according to the above-described present technology, the resolution in a general projection apparatus 11 will be described with reference to FIG. 7. FIG. 7 is an exemplary configuration of the general projection apparatus 11 illustrated in more detail, including portions around the laser light source sections 24R, 24G, and 24B, the mirror 25, the dichroic mirrors 26-1 and 26-2, the drive mirror 27, and the optical lens 28. Note that the configuration other than the configuration illustrated in FIG. 7 is assumed to be the same as the projection apparatus 11 in FIG. 4.

More specifically, each of the laser light source sections 24R, 24G, and 24B includes each of laser beam generators 24Ra, 24Ga, and 24Ba having individual wavelengths, and includes each of collimator lenses 24Rb, 24Gb, and 24Bb, respectively. That is, in each of the laser light source sections 24R, 24G, and 24B, each of the laser beam generators 24Ra, 24Ga, and 24Ba respectively generates a laser beam having a wavelength specific to each of the colors, and each of the collimator lenses 24Rb, 24Gb, and 24Bb collimates a laser beam of each of wavelengths and outputs the beam, respectively. Note that when there is no need to specifically distinguish the colors (wavelengths) between the laser beam generators 24Ra, 24Ga, and 24Ba and the collimator lenses 24Rb, 24Gb, and 24Bb, they will be simply referred to as the laser beam generator 24a and the collimator lens 24b.

Furthermore, on the basis of a red pixel signal (Video Data Current Red), an emission direction of the red laser beam generated by the laser beam generator 24Ra is appropriately adjusted by the collimator lens 24Rb, thereafter, the red laser beam is reflected by the mirror 25, and becomes incident on the dichroic mirror 26-1 from an upper position in FIG. 7.

On the basis of a green pixel signal (Video Data Current Green), an emission direction of the green laser beam generated by the laser beam generator 24Ga is appropriately adjusted by the collimator lens 24Gb, thereafter, the green laser beam is reflected by the dichroic mirror 26-1, and becomes incident on the dichroic mirror 26-2 from an upper position in FIG. 7. At this time, the dichroic mirror 26-1 transmits the red laser beam incident from an upper position in FIG. 7, whereby the red laser beam is incident on the dichroic mirror 26-2 from an upper position in FIG. 7.

Furthermore, on the basis of a blue pixel signal (Video Data Current Blue), an emission direction of the blue laser beam generated by the laser beam generator 24Ba is appropriately adjusted by the collimator lens 24Bb, thereafter, the blue laser beam is reflected by the dichroic mirror 26-2, and becomes incident on the drive mirror 27 from an upper position in FIG. 7. At this time, the dichroic mirror 26-2 transmits the red and green laser beams incident from above in FIG. 7, whereby the blue, red, and green laser beams become incident from an upper position of FIG. 7 to the drive mirror 27. As a result, the laser beams of red, green, and blue (RGB) are incident by the drive mirror 27 in a multiplexed state, so as to be controlled as one scanning line.

Meanwhile, the number of scanning lines for image output is determined by the relationship of the scanning speed of the drive mirror 27 with respect to the frame rate of the input image. In a case where the horizontal scanning period is 20 kHz, and when a period of one frame is 60 Hz, there are 666 horizontal scanning lines in one reciprocating movement per frame.

When the vertical scanning blanking time is 10%, the number of horizontal scanning lines available for displaying the projection image 14a per frame is about 600, thereby specifying the maximum resolution in the vertical direction. At this time, it is necessary to expand a swing angle of the drive mirror 27 in the vertical direction so as to separate the upper and lower scanning lines. Performing excessive expansion, however, might separate the upper and lower beams to form a gap between the scanning lines in the image, and thus, it is desirable to adjust the swing angle to the optimum swing angle according to the beam spot diameter.

Figure 8:
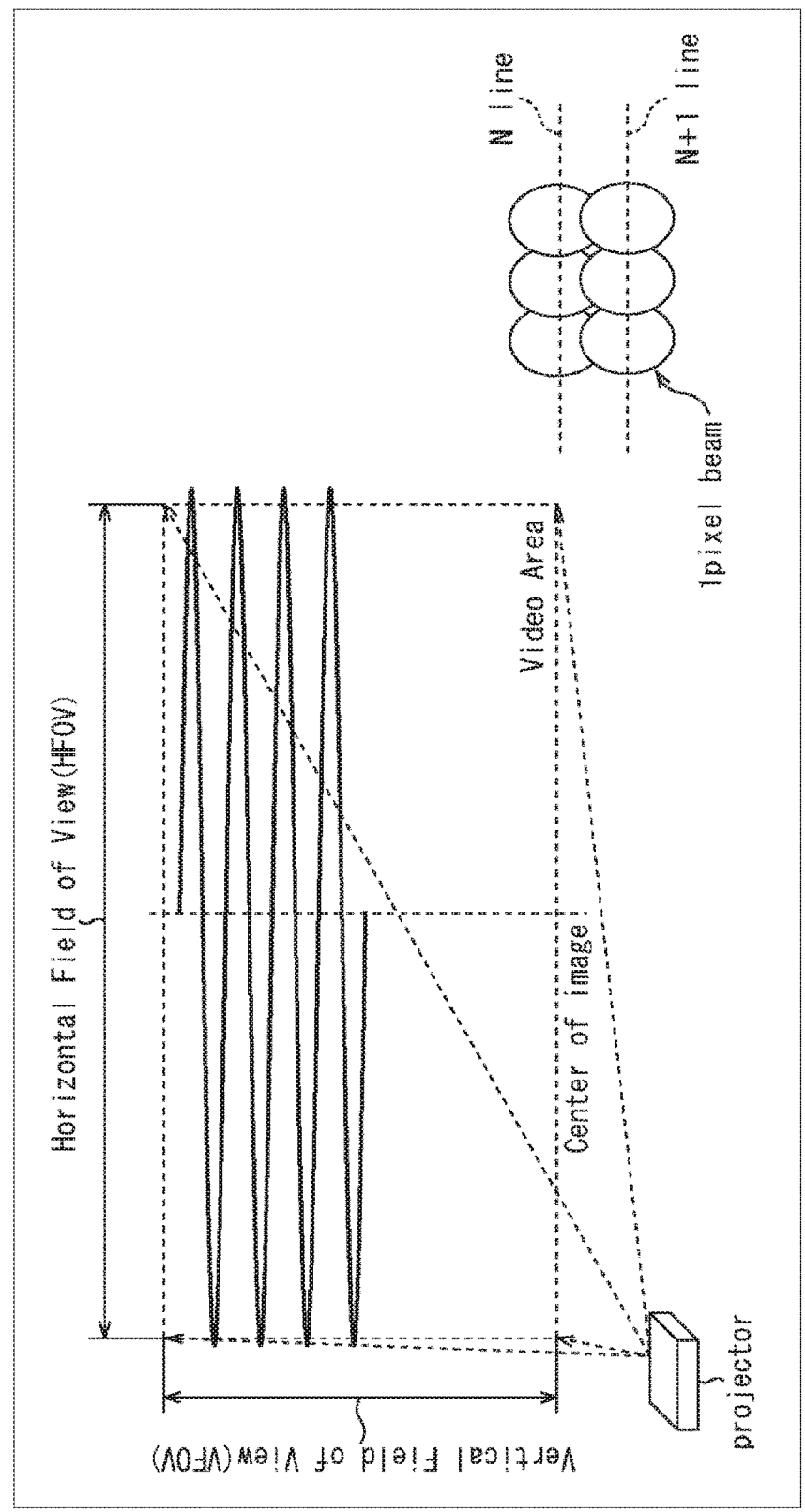
FIG. 8 is a diagram illustrating the resolution of a projection image by the configuration around the laser light source sections 24R, 24G, and 24B that generate laser beams of one system in a general projection apparatus.

For example, when the vertical resolution (the number of lines in the vertical direction) of the projection image 14a is Vres and the vertical field angle is VFOV (representing a vertical field of view; (mm)), as illustrated in the left portion of FIG. 8, the interval between the vertical lines are: Vline_step=VFOV/Vres (mm). Here, the interval between the vertical lines Vline_step needs to be a necessary and sufficient interval with respect to the designed beam spot diameter as illustrated in the right portion of FIG. 8. That is, three elliptical beam spots in the Nline (Nth line) and three beam spots in the (N+1) line ((N+1)th line) in the right portion of FIG. 8 need to have an interval that suppresses excessive overlapping with each other in the vertical direction and prevents a gap therebetween from exceeding a predetermined interval.

Moreover, the resolution in the horizontal direction of the projection image 14a is determined by the swing angle of the drive mirror 27 in the horizontal direction, the beam spot diameter, and the modulation speed of the beam. Among these, the swing angle needs to be wide enough with respect to the beam spot diameter and beam modulation speed. That is, as illustrated in the right portion of FIG. 8, there is a need to provide the interval that suppresses excessive overlapping with each other in the horizontal direction and that prevents a gap therebetween from exceeding a predetermined interval, as illustrated by the three beam spots of Nline and (N+1) line. Note that the horizontal field angle in the left portion of FIG. 8 becomes horizontal field of view (HFOV) (mm).

In this condition, in a case where the projection image 14a of 720 p (1280 pixels in the horizontal direction×720 pixel in the vertical direction) is to be output, it is difficult to output the original image signal without compression since the vertical resolution is limited to 600 lines. On the other hand, when the projection image 14a is output after the image signal is compressed from 720 lines to 600 lines, the vertical resolution of the image signal would decrease and the image quality will be degraded. In another case of attempting output of 720 lines without scaling, it would be necessary to enhance the scanning speed of the drive mirror 27 by about +20%.

There is a limit, however, to the scanning speed of the drive mirror 27, and in addition, pursuing excessively higher resolution would make it difficult to achieve the scanning speed corresponding to the resolution.

In view of this, it is conceivable to pursue enhancement of resolution by increasing the laser beam systems of the individual laser light source sections 24R, 24G, and 24B from one system to two or more systems, and constituting their scanning orbits to be shifted in the vertical direction, thereby increasing the scanning orbits.

<Exemplary Configuration of Projection Apparatus 11 According to Present Technology>

Next, a configuration around the portions including the laser light source sections 24R, 24G, and 24B, the mirror 25, the dichroic mirrors 26-1 and 26-2, the drive mirror 27, and the optical lens 28 in the projection apparatus 11 according to the present technology will be described with reference to FIG. 9. Note that in FIG. 9, the same reference numerals and the same names are given to components having the same functions as those in the configurations in FIGS. 4 and 7, and the description thereof will be omitted as appropriate.

Figure 9:
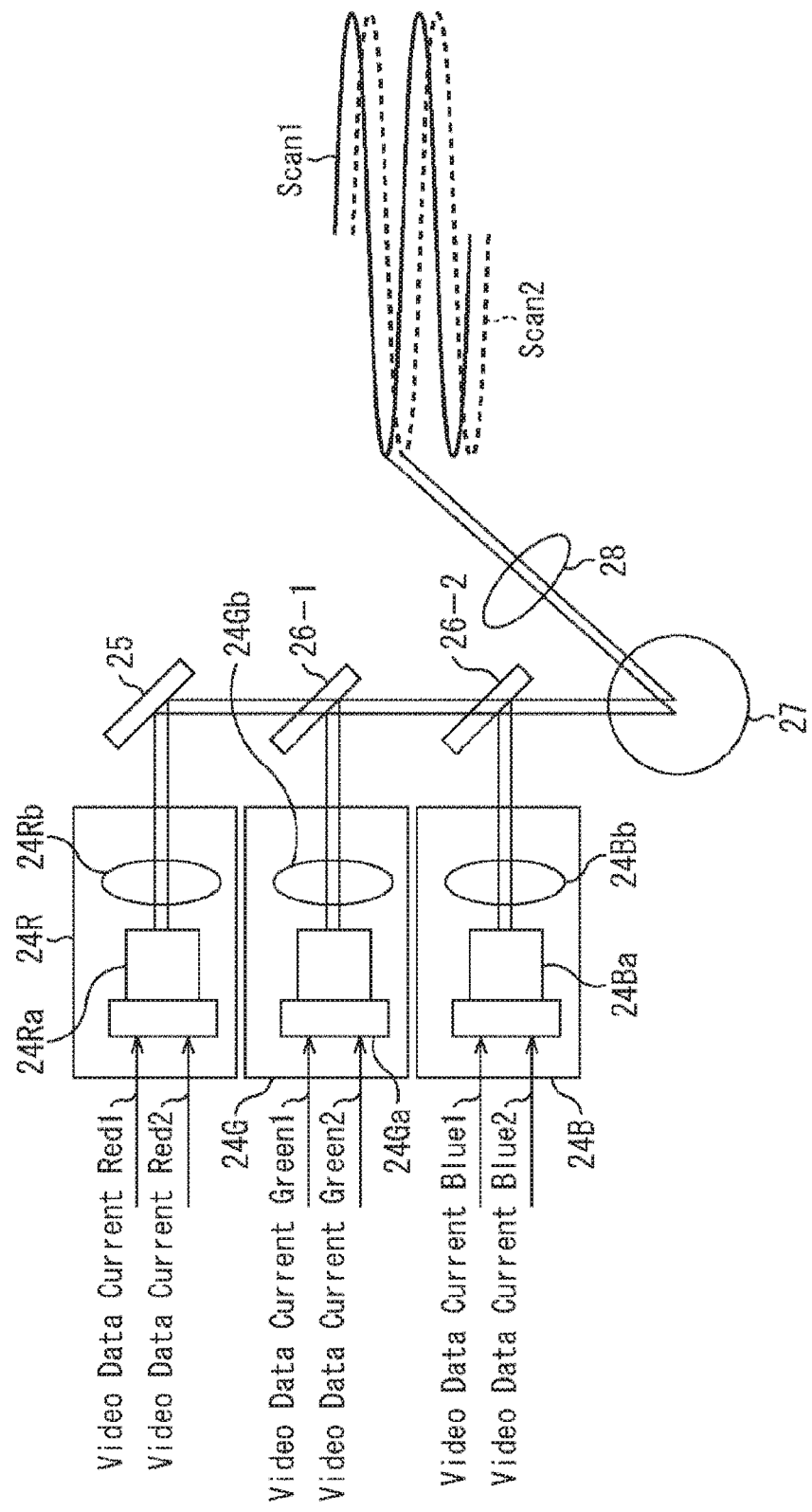
FIG. 9 is a diagram illustrating a configuration around laser light source sections 24R, 24G, and 24B in a projection apparatus according to the present technology.

Specifically, the projection apparatus 11 according to the present technology illustrated in FIG. 9 differs from the general projection apparatus 11 of FIG. 7 in that the laser beam systems of the individual laser light source sections 24R, 24G, and 24B have been increased from one system to two or more systems, so as to be configured to allow the individual scanning lines to be shifted in the vertical direction on the screen 14, as illustrated in FIG. 9.

As illustrated in the left portion of FIG. 9, the laser light source sections 24R, 24G, and 24B differ from the laser light source sections 24R, 24G, and 24B in FIG. 7 in that the RGB pixel signals, each coming from two systems (Video Data Current Red 1 and Red 2, Video Data Current Green 1 and Green 2, and Video Data Current Blue 1 and Blue 2) are input into the laser light source sections 24R, 24G, and 24B and each of the laser light source sections 24R, 24G, and 24B emits two-system (two) laser beams each having a predetermined shift width in the vertical direction.

In this case, as illustrated in the right portion of FIG. 9, two scanning orbits (RGB line scanning) scan 1 and scan 2 are formed.

Figure 10:
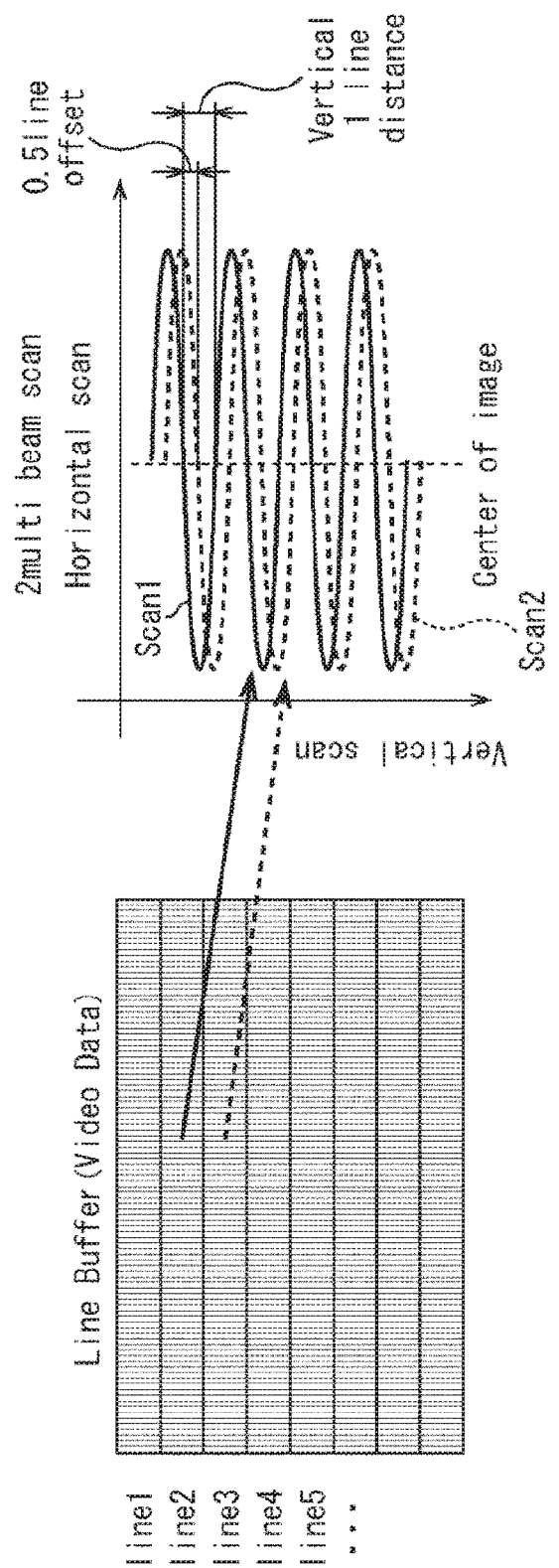
FIG. 10 is a diagram illustrating the resolution of a projection image by the configuration around the laser light source sections 24R, 24G, and 24B that generate laser beams of two systems in the projection apparatus according to the present technology.

Here, the RGB pixel signals (Video Data Current Red 1 and Red 2, Video Data Current Green 1 and Green 2, Video Data Current Blue 1 and Blue 2) are configured to form, for example, a scanning orbit scan 1 constituted with pixel signals of line 2 as illustrated in the right portion of FIG. 10 by the pixel data (Video Data Current Red 1, Video Data Current Green 1, and Video Data Current Blue 1) illustrated in the left portion of FIG. 10. Similarly, as illustrated in the right portion of FIG. 10, a scanning orbit scan 2 constituted with pixel signals of line 3 is formed by the pixel signal (Video Data Current Red 2, Video Data Current Green 2, Video Data Current Blue 2) illustrated in the left portion of FIG. 10.

In this case, for example, as illustrated in the right portion of FIG. 10, adjustment is performed such that the shift amount between the scanning orbits scan 1 and scan 2 becomes ½ (0.5 offset) of the scanning interval in the vertical direction (Vertical 1 line distance) of the scanning orbit scan 1. Performing adjustment in this manner enables the scanning orbits scan 1 and scan 2 to be evenly scanned.

As a result, the resolution in the vertical direction can theoretically be doubled at the maximum by scanning orbits of two systems.

Figure 11:
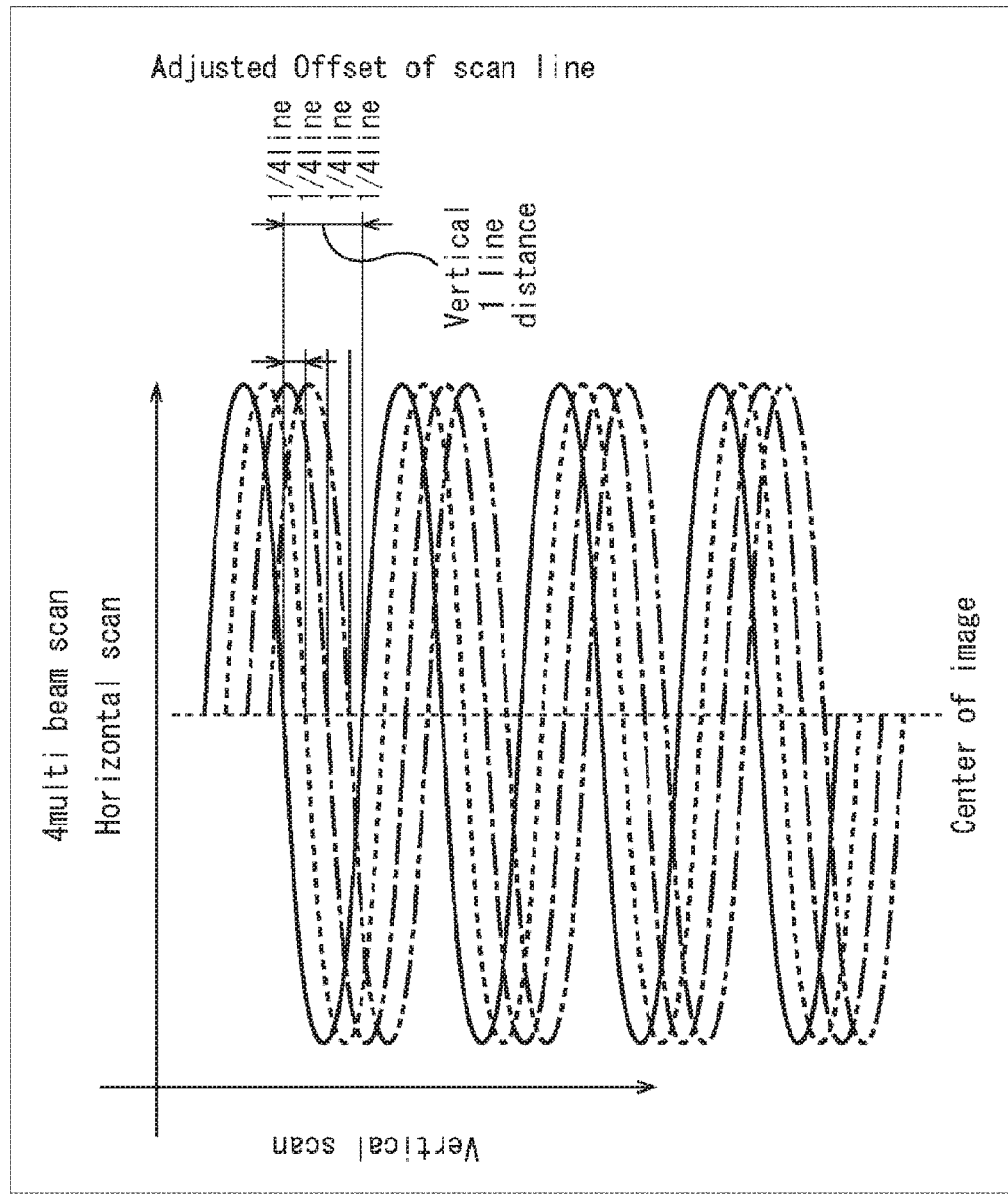
FIG. 11 is a diagram illustrating the resolution of a projection image by the configuration around the laser light source sections 24R, 24G, and 24B that generate laser beams of four systems in the projection apparatus according to the present technology.

Similarly, by generating N laser beams emitted from the laser light source section 24, the scanning orbit can be increased by N times. For example, in the case of N=4, as illustrated in FIG. 11, the number of scanning orbits can be increased to four. In this case, by setting the shift amount ¼(¼ line) with respect to the scanning interval in the vertical direction (Vertical 1 line distance) of one scanning orbit, the four scanning orbits are shifted at equal intervals in the vertical direction.

<Exemplary Configuration of Laser Beam Generator 24a>

Next, an exemplary configuration of the laser beam generator 24a in the case of generating laser beams of two systems will be described with reference to FIG. 12.

Figure 12:
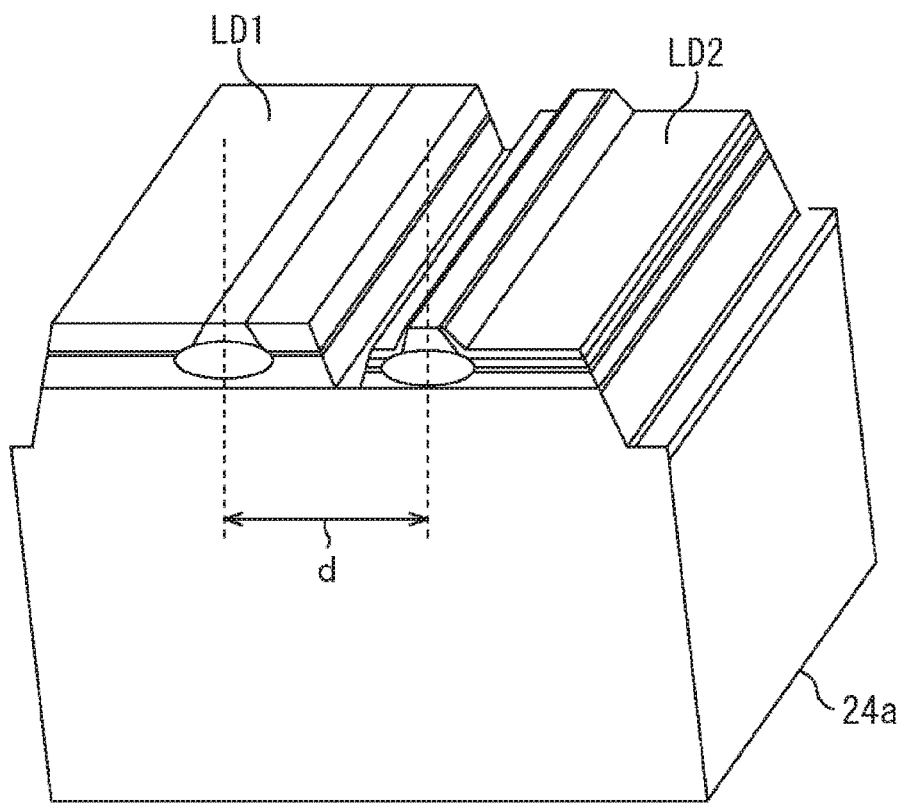
FIG. 12 is a diagram illustrating an exemplary configuration of a laser beam generator.

As illustrated in FIG. 12, the laser beam generator 24a is constituted with a monolithic multi-beam laser diode (LD) formed with two laser diodes LD1 and LD2 in order to shift the scanning orbits with high accuracy and maintain the shift amount. The optical axis is adjusted by the laser diodes LD1 and LD2.

The monolithic multi-beam LD incorporates the laser diodes LD1 and LD2 constituted with a plurality of light emitting elements having a light emitting function having a stripe structure formed on a semiconductor substrate by photolithography. The monolithic multi-beam LD has an integrated structure with the directions of the laser diodes LD1 and LD2 as the light emitting elements of the stripe structure being adjusted with high accuracy, making it possible to adjust the relative position of the light emitting point with high accuracy.

Accordingly, the monolithic multi-beam LD is configured to allow a light emitting point interval between the laser diodes LD1 and LD2 to appear as a shift on the screen 14. A large shift on the screen 14 would decrease the region for enhancing the resolution in the two scanning orbits, leading to a smaller field angle of the projection image 14a and decreased brightness of the projection image 14a due to increased blanking time.

Figure 13:
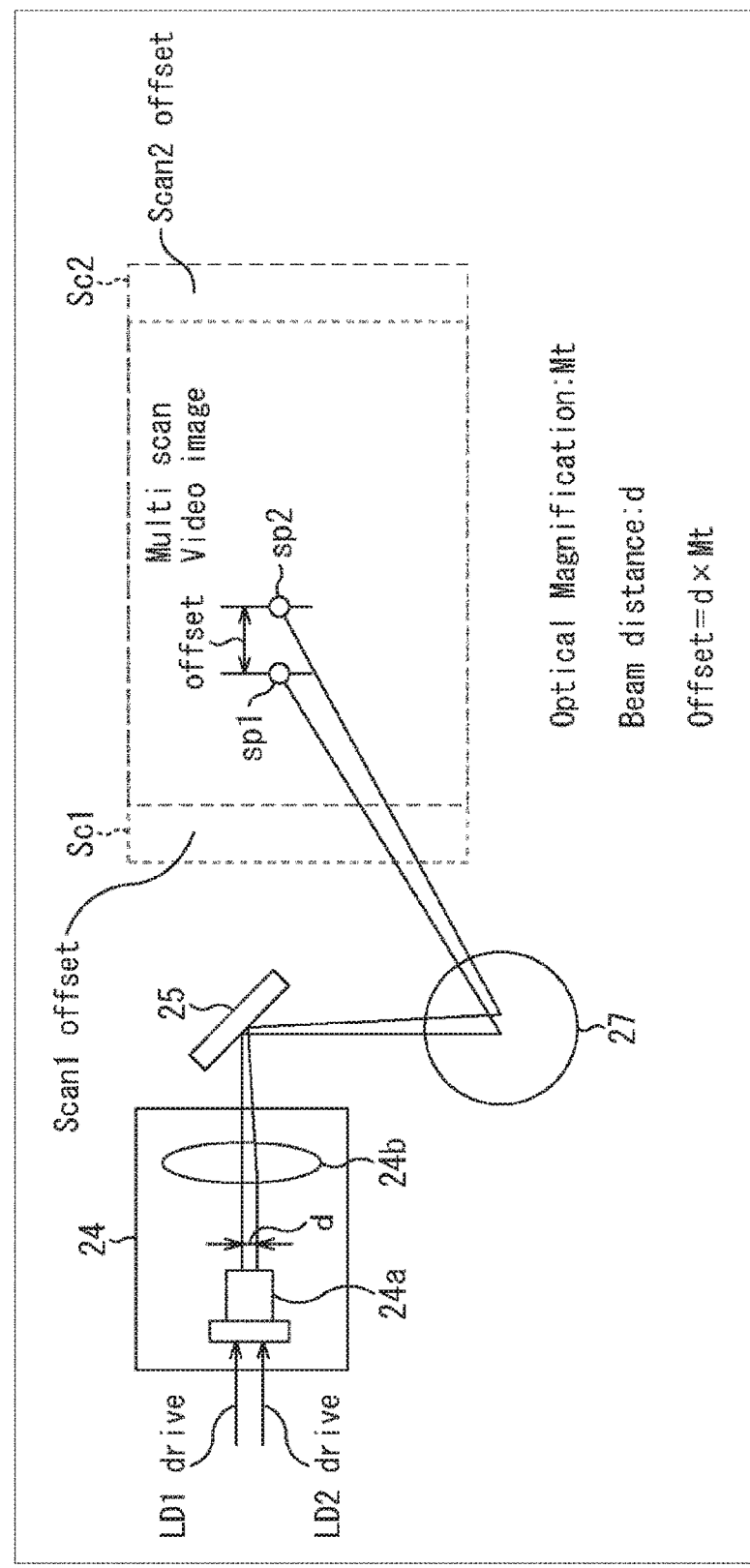
FIG. 13 is a diagram illustrating a relationship between shift amounts of two laser diodes of the laser beam generator and the resolution.

Here, as illustrated in FIGS. 12 and 13, when the light emitting point interval of the laser diodes LD1 and LD2 is d (um) and the optical magnification is Mt, the shift amount (offset) of each of the laser spots SP1 and SP2 on the screen 14 is as illustrated in FIG. 13 as follows: offset=d×Mt. Here, the ranges scanned by the scanning orbit Scan1 and the scanning orbit Scan2 are the ranges Sc1 and Sc2, respectively, and the resolution is doubled in the region where the ranges Sc1 and Sc2 overlap with each other. However, when the shift amount (offset) is the shift amount in the horizontal direction, there might be resolution reduction regions of Scan1 offset and Scan2 offset in which the scanning ranges Sc1 and Sc2 scanned by the scanning orbit Scan1 and the scanning orbit Scan2 do not overlap with each other on the left and right sides of the screen 14, respectively, with a width corresponding to an offset width. The resolution reduction regions Scan1 offset and Scan2 offset corresponding to the offset width are regions in which the image quality is degraded because both the resolution and the brightness are reduced to a half of the range in which the ranges Sc1 and Sc2 overlap with each other.

In the case of using solely the high resolution region, the horizontal blanking time increases due to the resolution reduction regions Scan1 offset and Scan2 offset, leading to a decrease in brightness (lm). Accordingly, it is desirable to reduce the blanking time as much as possible by decreasing the light emitting point interval d.

On the other hand, decreasing the beam emitting point interval d would cause the heat of mutual beams to interfere with each other, leading to an influence of decreasing the light emitting power, and thus, there is a need to optimize the light emitting point interval d. In consideration of these, it is desirable that the optimum light emitting point interval d is, for example, about 5 um to 50 um.

The laser beam generator 24a constituted with a monolithic multi-beam LD needs optical adjustment for adjusting the shift amount generated in the dimension between the laser diodes LD1 and LD2 to a desired shift amount of the scanning orbit.

Figure 14:
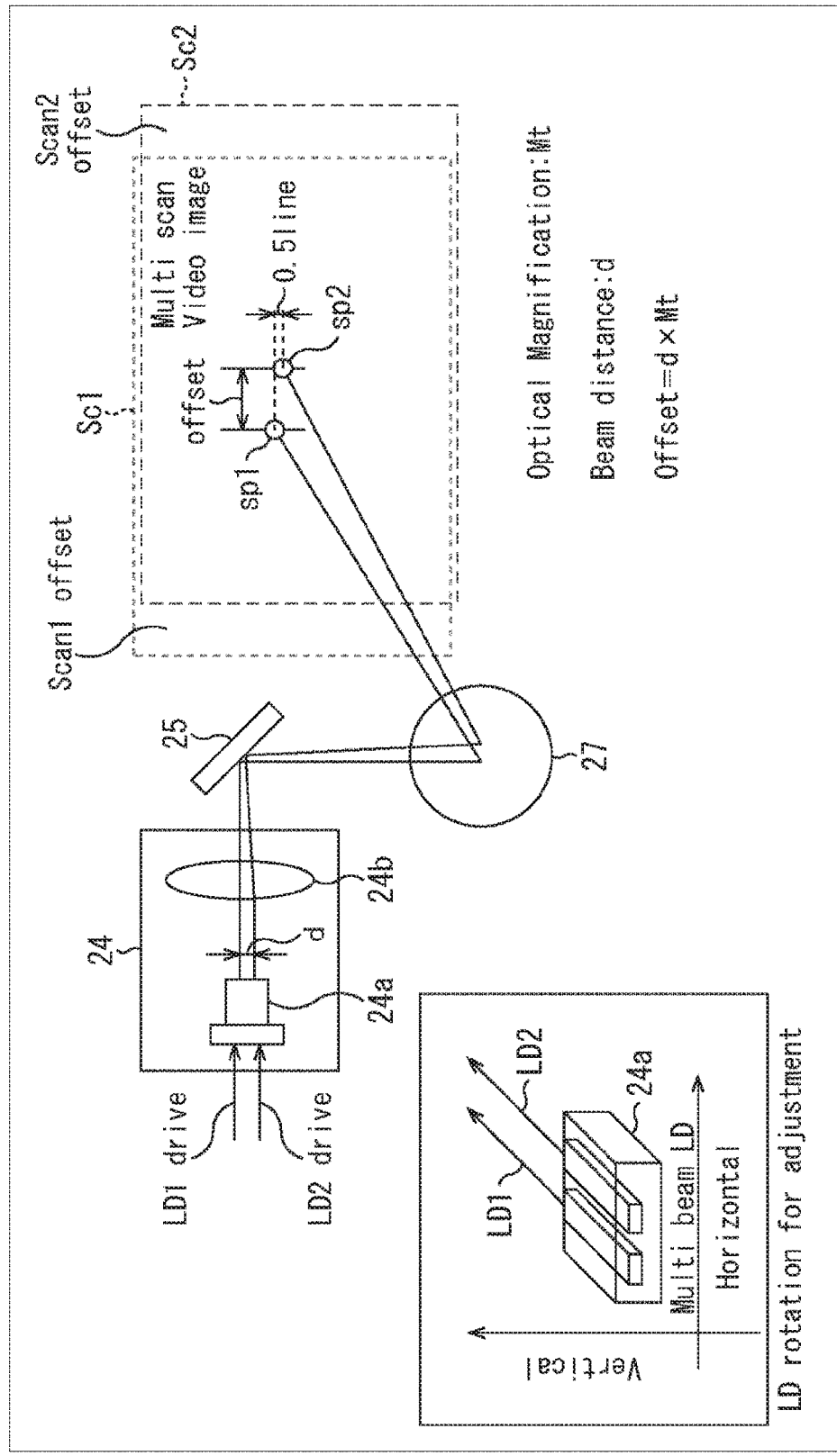
FIG. 14 is a diagram illustrating a method of setting the shift amounts of two laser diodes of the laser beam generator.

More specifically, for example, as illustrated in FIG. 14, there would be an adjustment method of fixing the shift amount at a point where the shift amount at the spots Sp1 and Sp2 on the screen 14 in the vertical direction becomes ½ line (=0.5 line) by rotating the laser beam generator 24a.

Here, when the number of horizontal scanning lines (vertical resolution) of the projection image 14a is set to 600 lines, with the field angle in the vertical direction being 450 mm, the interval Vline_step of 1 line is Vline_step=450 mm/600 line=0.75 mm/line.

In this case, by adjusting the interval in the vertical direction of the two scanning orbits to ½ line, that is, 0.75 mm/2≈0.375 mm, the two scanning orbits scan a position shifted by ½ line with respect to the mutual scanning orbit, making it possible to fill the gap between the vertical lines with mutually different scanning orbits.

This adjustment is performed for each of the RGB laser beam generators 24a, so as to realize an RGB beam group having two different scanning orbits. The individual beams shifted in the horizontal direction and the vertical direction are individually modulated by the pixel signals at corresponding positions.

Figure 15:
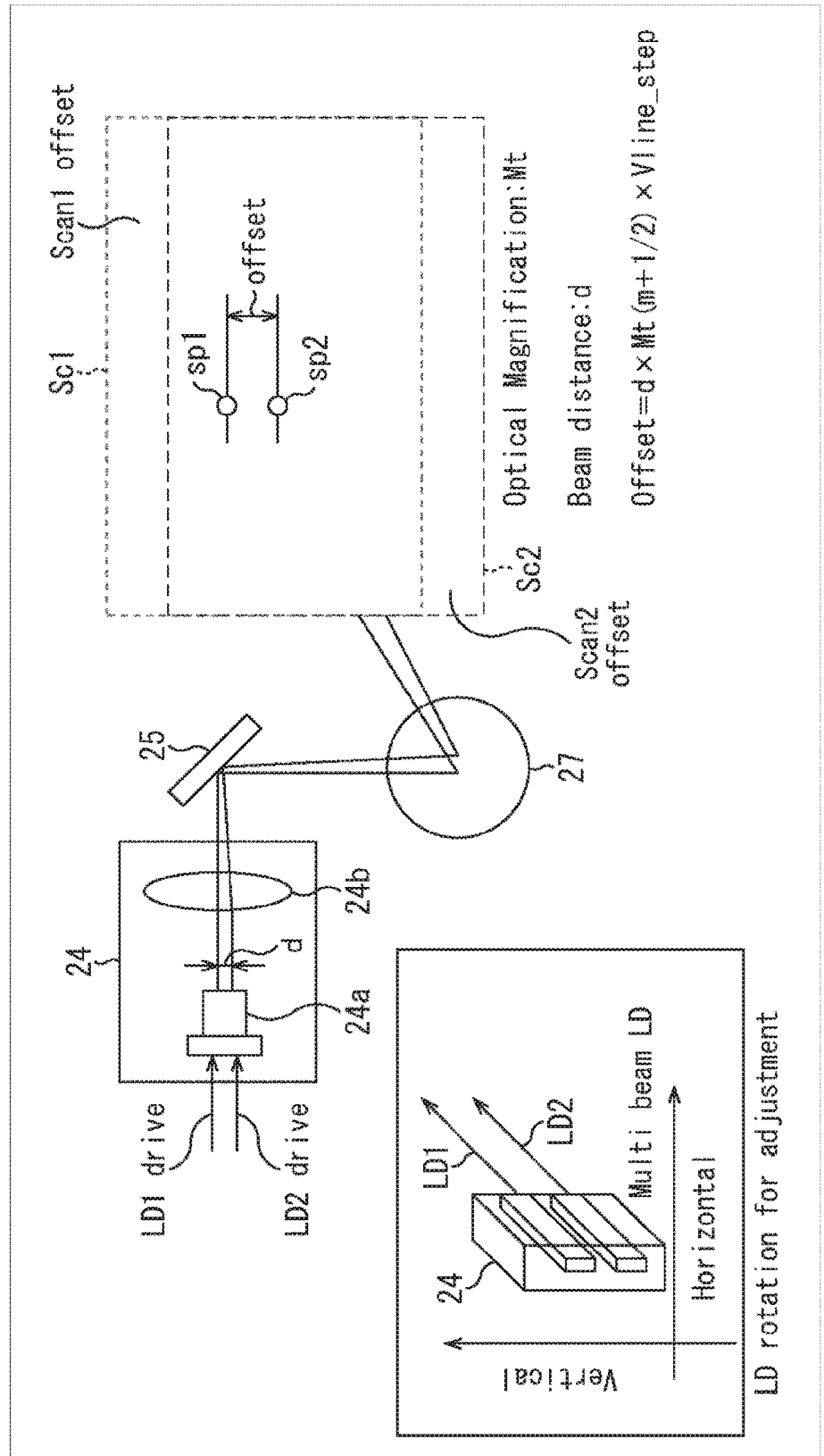
FIG. 15 is a diagram illustrating a method of setting the shift amounts of two laser diodes of the laser beam generator.

In addition, as illustrated in FIG. 15, the light emitting point interval of the laser spots sp1 and sp2 projected on the screen 14 by the laser diodes LD1 and LD2 of the laser beam generator 24a may be designed to match the vertical line shift.

Here, in a case where the shift amount d is set to 10 um as the minimum size achievable as the interval between the laser diodes LD1 and LD2, the size is determined in further consideration of the optical magnification. For example, in consideration of the relationship of Mt×d=m×Vline_step +½Vline_step when the optical magnification is Mt, the shift amount d is: $d=(m+½)$ Vline_step/Mt. Herein, m is a vertical scanning line interval coefficient for adjusting the interval between the vertical scanning lines. At this time, by further decreasing the shift amount d, it is possible to reduce the resolution reduction regions Scan 1 offset and Scan 2 offset, leading to enhancement of the resolution. Note that in this case, the shift between the beams is small in the horizontal direction and the shift of (m+½) lines occurs in the vertical direction.

Figure 16:
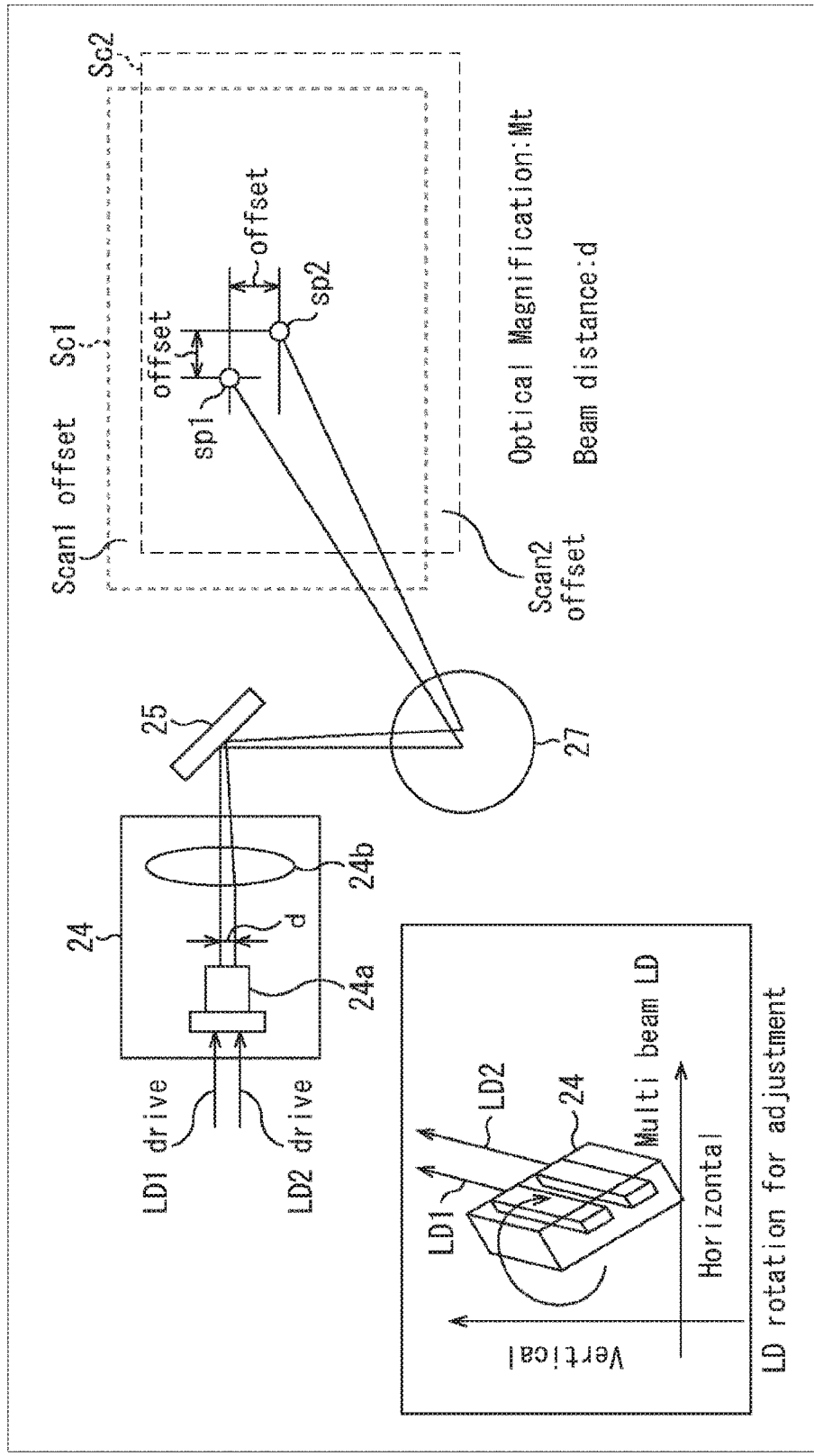
FIG. 16 is a diagram illustrating a method of setting the shift amounts of two laser diodes of the laser beam generator.

Furthermore, as indicated by the arrow illustrated in the lower left portion of FIG. 16, the light emitting point interval of the laser spots sp1 and sp2 projected on the screen 14 by the laser diodes LD1 and LD2, respectively, of the laser beam generator 24a may be diagonally arranged by rotation to match the vertical line shift.

In this case, blanking in both the horizontal and vertical scanning regions increases in the resolution reduction regions Scan1 offset and Scan2 offset. As illustrated in FIG. 14, an image memory needed for correcting the projection image 14a is desirably the one enabling the shift amount in the vertical direction being ½ line.

Note that the configuration of the laser beam generator 24a is not limited to a monolithic multi-beam LD, and it is also possible in principle to enhance the vertical resolution by using a plurality of single beam diodes each including the laser diodes LD1 and LD2 in a state where the diodes are mutually bonded with adhesion.

Figure 17:
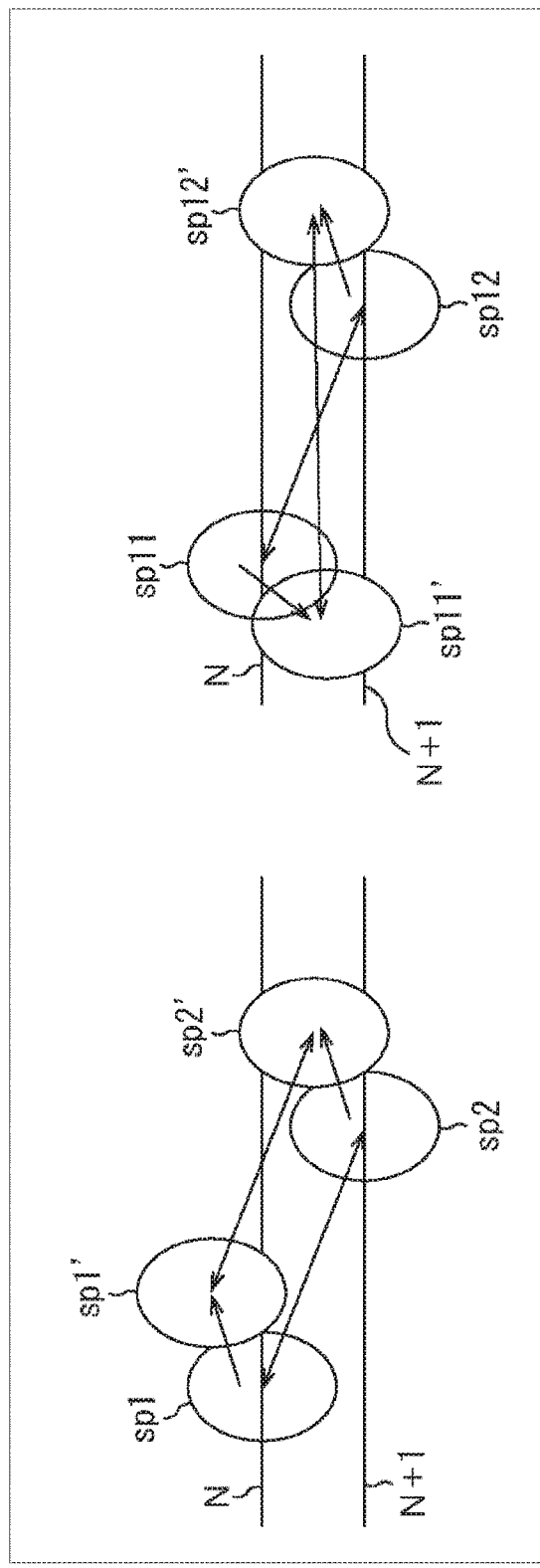
FIG. 17 is a diagram illustrating a difference in occurrence of the shift between a case where the shift amounts of two laser diodes of the laser beam generator are separately set and a case where the shift amounts are fixed.

In this case, however, there might be a situation in which the fixed state of the adhesive actually varies due to thermal expansion, or the like, due to temperature, and the emission directions of the laser diodes LD1 and LD2 that have been shifted are randomly shifted, and, for example, as illustrated in the right portion of FIG. 17, leading to a possibility that a correction according to each of the shift amounts is needed for each of the beams. Specifically, as in the right portion of FIG. 17, even though the emission directions of the laser diodes LD1 and LD2 are set to achieve the laser spots sp11 and sp12 on the screen 14, the both directions might be shifted individually and independently as illustrated by the laser spots sp11' and sp12'.

In contrast, in the case of the laser beam generator 24a using the monolithic multi-beam LD, even when there is a shift due to temperature, a constant interval is maintained with regard to the emission direction between the laser diodes LD1 and LD2 using the same monolithic multi-beam LD, and the relative positions of the beams are properly set with high accuracy. With this configuration, even when the shift occurs, as illustrated in the left portion of FIG. 17, the laser spots sp1 and sp2, which are original target projection positions on the screen 14 merely changes to the laser spots sp1' and sp2'. Since the mutual relationship is maintained in this shift, adjustment by correction is easier.

Moreover, the range of the vertical scanning line interval coefficient m in the (m+1/N) lines described above is determined by the vertical resolution to be realized, that is, the number of lines in the vertical direction.

For example, when the number of vertical scanning lines available for drawing the projection image 14a in one type of scanning orbit is Vline_single (the number of scanning lines in the VFOV (image output range)), the number of scanning lines Vline_multi that can be achieved by scanning using a plurality of systems of laser beams is expressed as: Vline_multi (line)=(Vline_single−m)×N.

Here, under the condition that a resolution of Vline_single or higher is obtained, the upper limit value of the vertical scanning line interval coefficient m is expressed as: (Vline_single−m)×N≥Vline_single, and the vertical scanning line interval coefficient m is expressed as: m≤Vline_single (1−1/N). Here, the lower limit value of the vertical scanning line interval coefficient m corresponds to a condition that maximizes the number of scanning lines, and then, m=0.

With the above configuration, it is possible to enhance the resolution without changing the scanning speed of the drive mirror 27, and display the projection image 14a with higher definition. This results in achievement of high resolution in the projection image projected by the projection apparatus, and achievement of high image quality.

<RGB Optical Axes Misalignment>

Next, misalignment of the optical axes of the laser light source sections 24R, 24G, and 24B will be described.

The above description is an exemplary case where the resolution is enhanced without changing the scanning speed of the drive mirror using the laser light source sections 24R, 24G, and 24B of two or more systems. In this case, however, when each of the laser light source sections 24R, 24G, and 24B is assembled, misalignment occurs in practice in individual optical axes in general, and usage of two or more systems of light sources for each of the colors might increase the influence due to bleeding.

That is, in a case where each of the laser light source sections 24R, 24G, and 24B is of one system, misalignment might occur even when the laser light source sections 24R, 24G, and 24B are configured as illustrated in FIG. 7 and the individual optical axes are adjusted. This includes, for example, a case where the laser spot is formed by emission as illustrated in FIG. 18.

Figure 18:
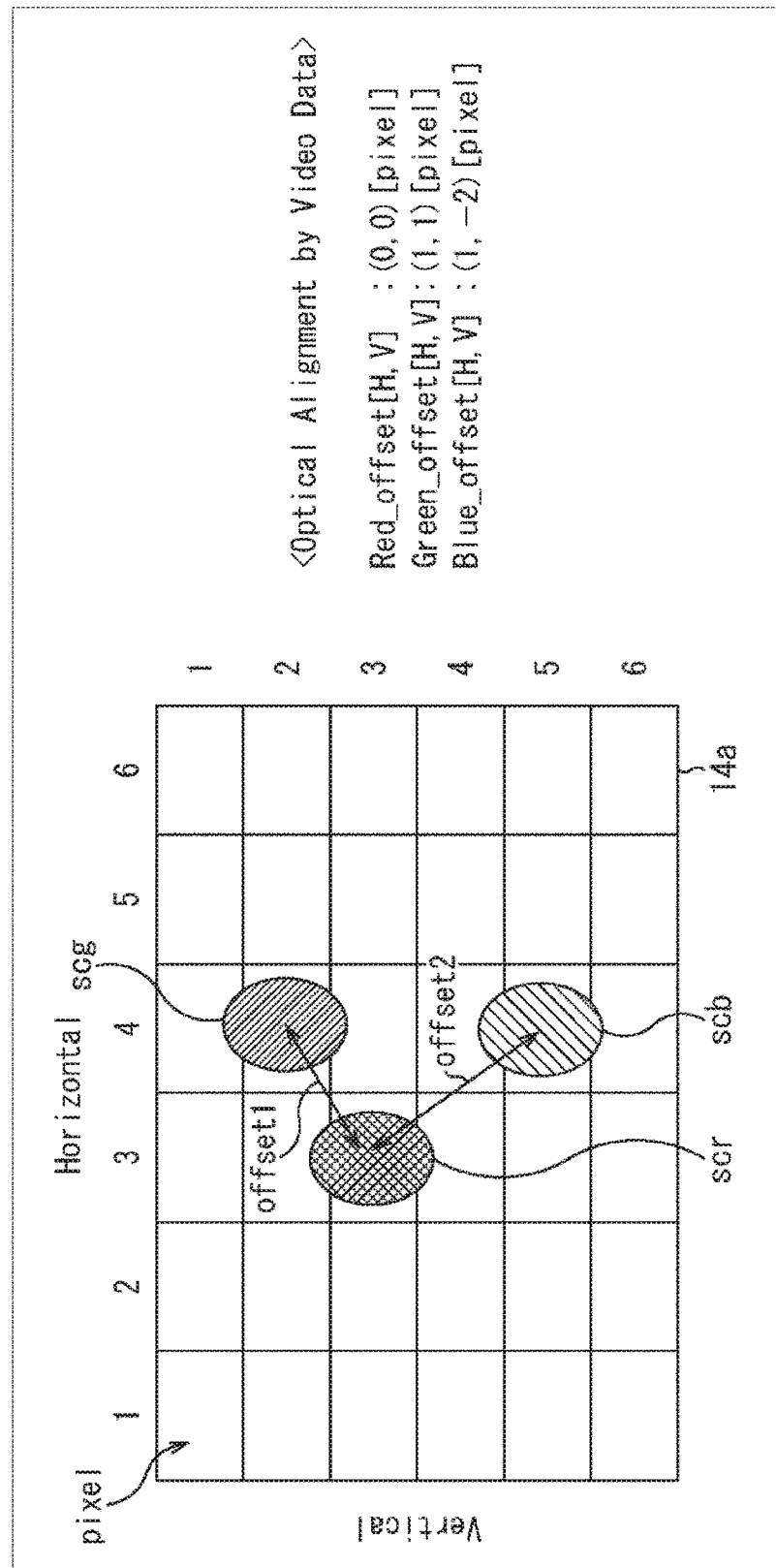
FIG. 18 is a diagram illustrating misalignment of laser spots caused by the shifts of the optical axes of a laser light source section 24.

FIG. 18 illustrates examples of the individual laser spots scr, scg, and scb emitted on the screen 14 by the laser light source sections 24R, 24G, and 24B in FIG. 7, in which each of squares indicates a pixel position. For example, in a case of using the laser spot scr as a reference, an offset offset1 between the laser spot scr and the laser spot scg and an offset offset2 between the laser spot scr and the laser spot scb are generated.

The offsets, namely, offset1 and offset2 are expressed as (1, 1) and (1, −2), respectively, when expressed by coordinates with the laser spot scr as the origin.

Figure 19:
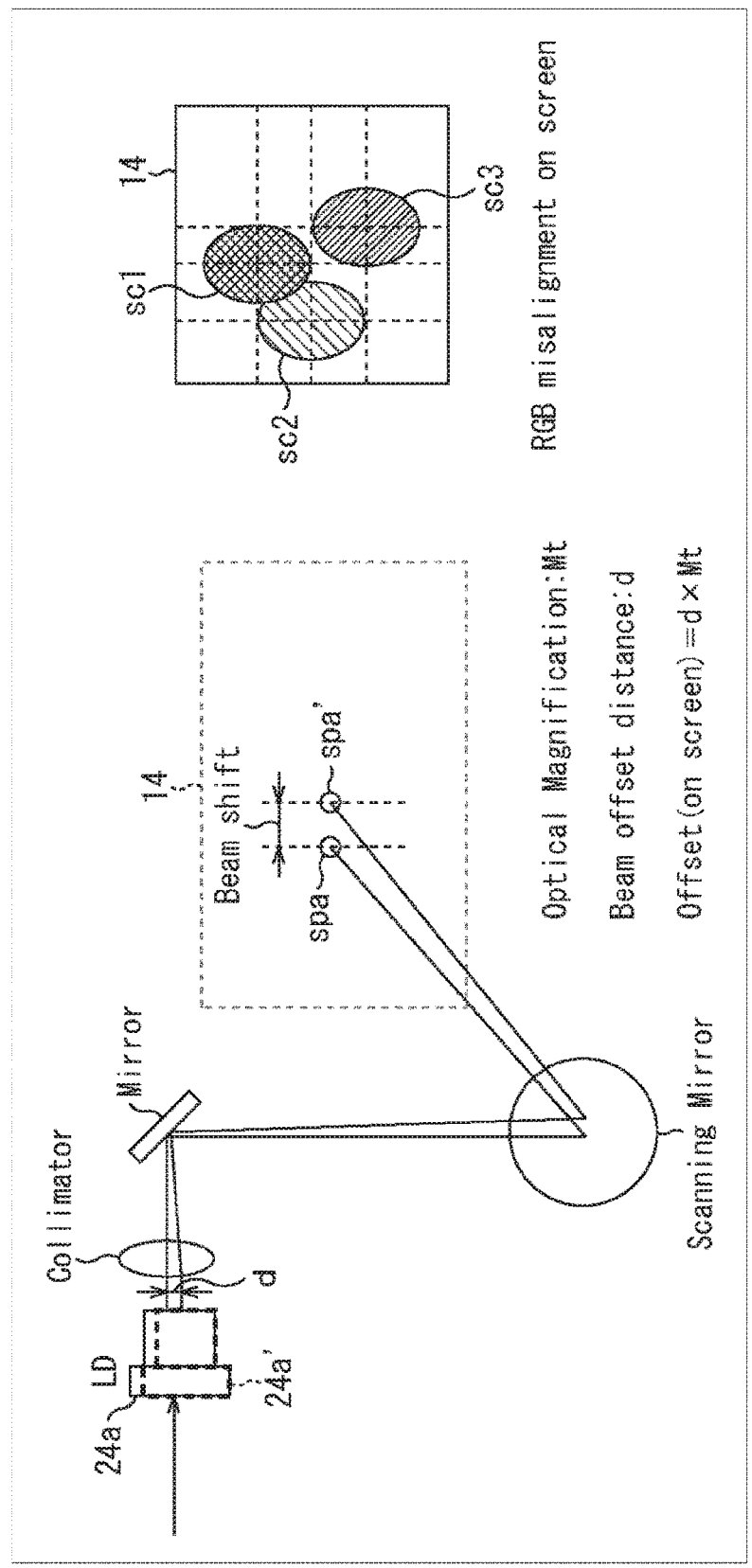
FIG. 19 is a diagram illustrating misalignment of laser spots caused by the shifts of optical axes of laser light source sections 24R, 24G and 24B.

More specifically, for example, as illustrated in the left portion of FIG. 19, while the laser beam generator 24a is intended to be provided in an original adjusted state, the laser beam generator 24a is provided in a state of having an adjustment shift d, indicated by a laser beam generator 24a'. This generates a shift formed with an offset (Beam shift) (=Offset=d×Mt) between the individual beam spots spa and spa' on the screen 14, when the optical magnification up to the screen 14 is Mt. Accordingly, when such a shift occurs in each of the laser light source sections 24R, 24G, 24B, the laser spots sc1, sc2, and sc3 which should originally be projected to a same position, for example, might be projected at different positions, as illustrated in the right portion of FIG. 19.

For example, in a case of using a system in which the projection image 14a has a horizontal field angle of 800 mm, a vertical field angle of 450 mm, and 720 p (1280 pixels in the horizontal direction×720 pixels vertically (1 pixel=0.625 mm)) and the optical magnification is 500, the shift amount d in the light source would become 1.0 mm on the screen, that is, misalignment of 3.2 pixels, leading to great deterioration of the image quality.

Therefore, for example, it is allowable to correct the optical axis shift in the laser light source sections 24R, 24G, and 24B by measuring the offset (offset1 and offset2) as illustrated in FIG. 18 and by correcting such that the signals of the pixels that should actually exist at the positions of the offset (offset1 and offset2) of the laser light source sections 24R, 24G, and 24B are to be emitted respectively at the laser spots scg and scb, as a laser spot scr emitted by the laser light source section 24R as a reference.

<Exemplary Configuration of Projection Apparatus 11 According to Second Embodiment of Present Technology>

Next, an exemplary configuration of the projection apparatus 11 in FIG. 1 according to a second embodiment of the present technology will be described with reference to FIG. 20. In this configuration, test emission is performed toward the laser light source sections 24R, 24G, and 24B to detect misalignment of the optical axes, and pixel signals at positions obtained by relative offset 1 and offset 2 are projected as laser spots emitted by the laser light source sections 24G and 24B, thereby correcting the shifts of each of the laser light source sections 24R, 24G and 24B, with the pixel formed by the laser spot emitted by the laser light source section 24R being defined as a reference. Note that in FIG. 20, the same reference numerals and the same names are given to components having the same functions as those in the projection apparatus 11 in FIG. 4, and the description thereof will be omitted as appropriate.

Figure 4:
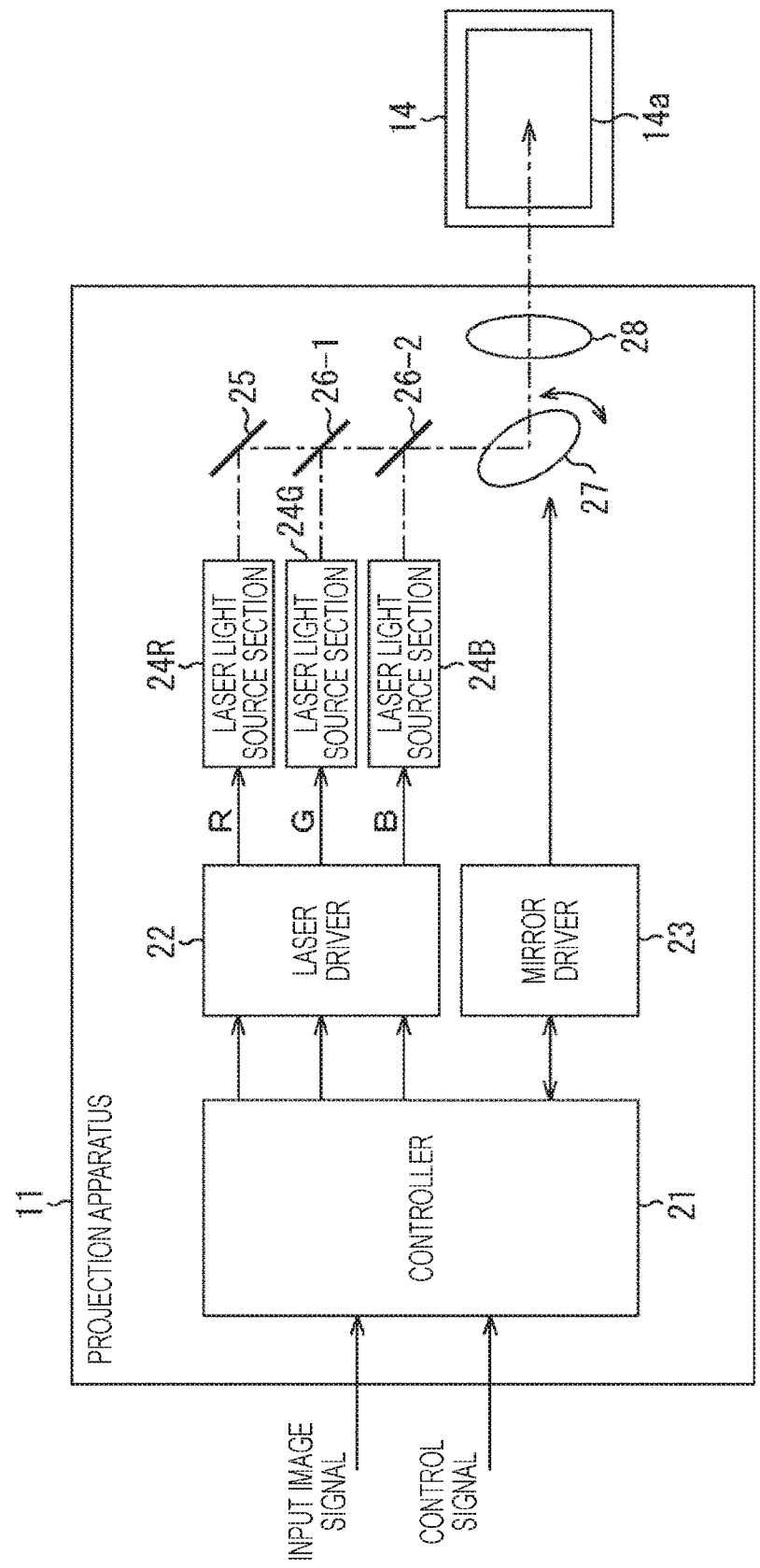
FIG. 4 is a block diagram illustrating an exemplary configuration according to the first embodiment of the projection apparatus in FIG. 1.
Figure 20:
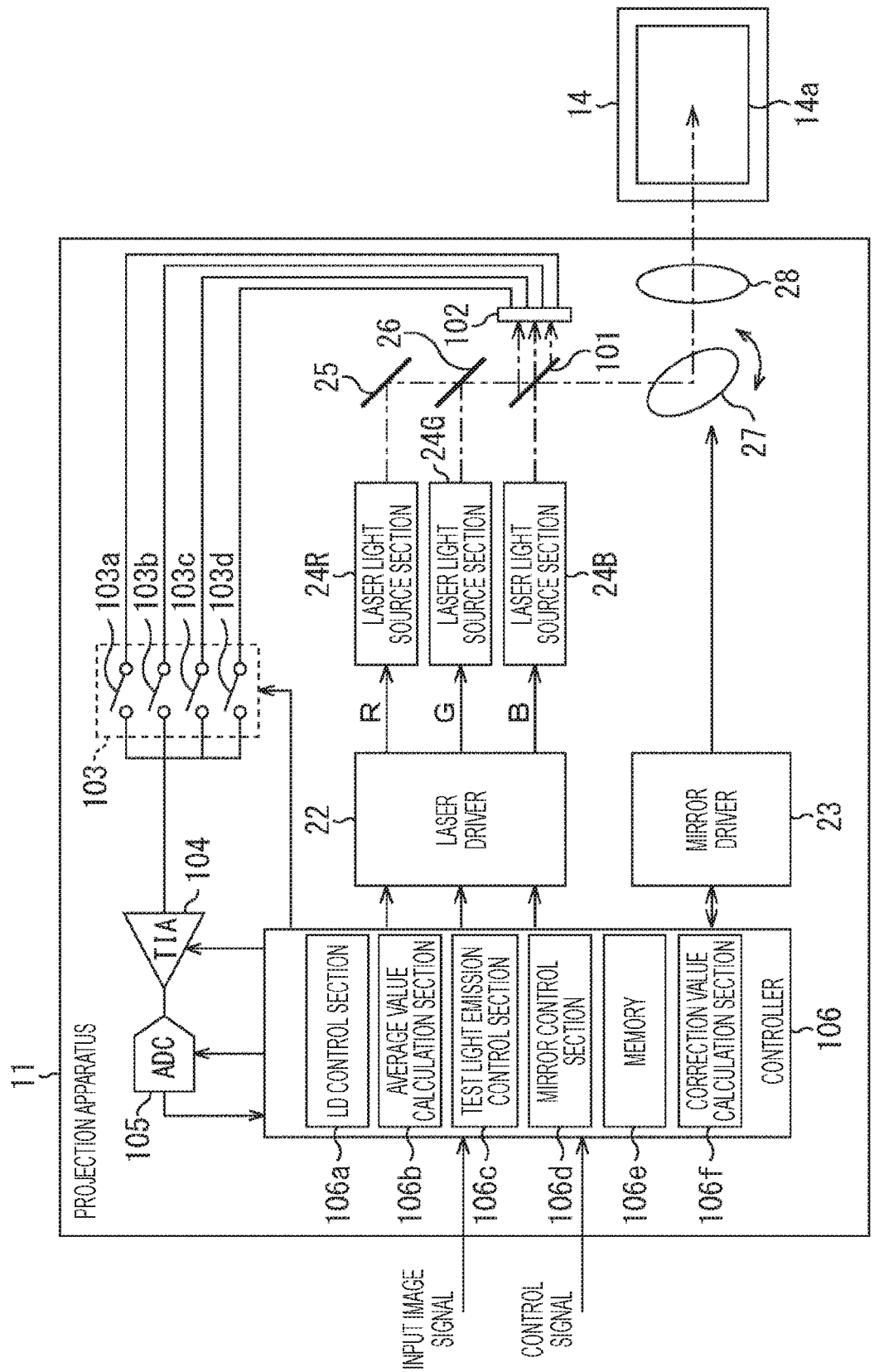
FIG. 20 is a block diagram illustrating an exemplary configuration according to a second embodiment of the projection apparatus in FIG. 1.

Specifically, the projection apparatus 11 in FIG. 20 differs from the projection apparatus 11 in FIG. 4 in that the configuration includes a beam splitter 101 and a controller 106 instead of the dichroic mirror 26-2 and the controller 21, and further includes a photodetector (PD) 102, a switching section 103, a trance impedance amplifier (TIA) 104, and an analog digital converter (ADC) 105.

The beam splitter 101 reflects a portion of the red laser beam towards the PD 102, reflects a portion of the green laser beam toward the PD 102, and transmits a portion of the blue laser beam toward the PD 102.

Figure 21:
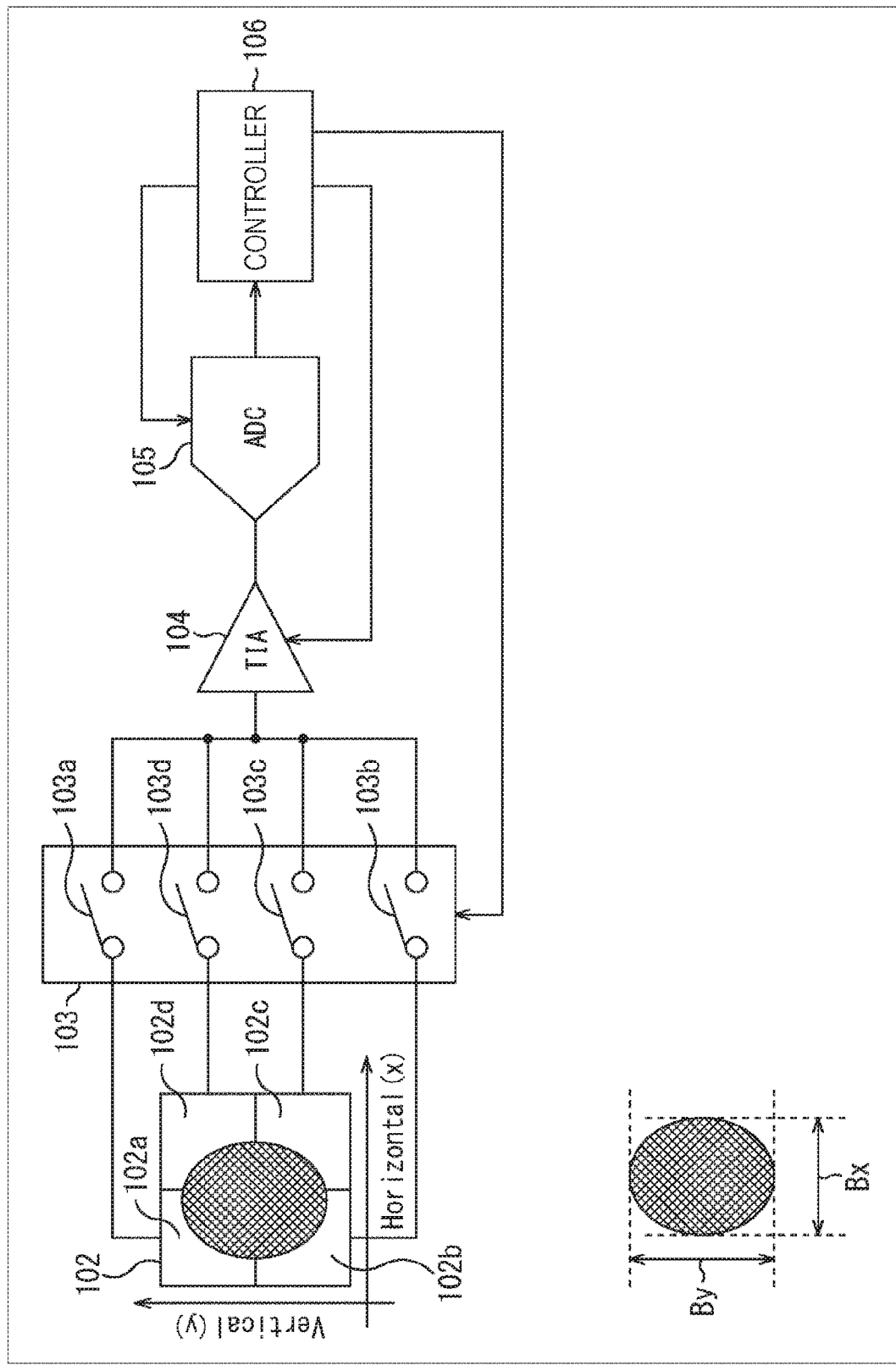
FIG. 21 is a diagram illustrating a detailed configuration of a PD in the projection apparatus in FIG. 20.

For example, as illustrated in FIG. 21, the PD 102 is divided into a total of four (2×2) regions 102a to 102d in the horizontal direction and the vertical direction, and each of the regions generates a signal current corresponding to the light amount, and outputs the generated signal current to each to the switches 103a to 103d of the switching section 103, respectively. Note that the ellipse in the PD 102 indicates the spot shape of the laser beam incident on the PD.

The switching section 103 is constituted with switches 103a to 103d, with on/off of each of which being controlled by the controller 106. With this configuration, the signal current of each of the regions 102a to 102d of the PD 102 is switched and output to the TIA 104.

Under the control of the controller 106, the TIA 104 converts the signal current to a signal voltage at a predetermined rate, and outputs the signal voltage to the ADC 105.

The ADC 105 converts a signal voltage formed of an analog signal supplied from the TIA 104 into a digital signal and supplies it to the controller 106.

The controller 106 basically has the same function as that of the controller 21, and further includes a function of correcting the shift by controlling the switching section 103 to the ADC 105. More specifically, the controller 106 includes an LD control section 106a, an average value calculation section 106b, a test light emission control section 106c, a mirror control section 106d, a memory 106e, and a correction value calculation section 106f.

The LD control section 106a controls the laser driver 22 so as to allow the pixel signal of the pixel position in the input image signal to be corrected to the pixel signal of the pixel position to be actually shifted in projection caused by the shift of the optical axis and to be emitted using the correction values for correcting the shifts of the optical axes of the laser light source sections 24R, 24G, and 24B calculated by the correction value calculation section 106f and stored in the memory 106e. Moreover, the LD control section 106a controls the laser driver 22 so as to allow the pixel signal of the pixel position in the input pixel signal to enable the pixel light output actually projected to be the light output that corresponds to an expected value using a correction value for correcting a difference between a detection value and the expected value in the light output of the laser light source sections 24R, 24G, and 24B calculated by the correction value calculation section 106f and stored in the memory 106e. In short, the LD control section 106a causes the laser light source sections 24R, 24G, 24B to emit laser beams by controlling the laser driver 22 so as to correct the optical axis shift and the light output using the two correction values, namely, the correction value for correcting the optical axis shift and the correction value for correcting the light output.

The average value calculation section 106b calculates an average value of the luminance in units of frames of the pixel signal output by the LD control section 106a and supplies the calculated value to the test light emission control section 106c.

On the basis of the mirror synchronization signal for controlling the mirror driver 23, supplied from the mirror control section 106d, the test light emission control section 106c specifies the operation direction of the drive mirror 27, and determines the timing of performing test light emission for calculating the correction value, and outputs a command to the LD control section 106a so as to perform test light emission with an emission intensity corresponding to the average value of the luminance of the frame supplied from the average value calculation section 106b. At this time, the test light emission control section 106c controls on/off of the switches 103a to 103d in the switching section 103, controls the amplification rate of the TIA 104, and further controls the voltage signal measurement timing of the ADC 105.

On the basis of the signal voltages in the each of the regions 102a to 102d measured by the ADC 105 received by the PD 102 by the test light emission of each of the laser light source sections 24R, 24G and 24B, the correction value calculation section 106f specifies the individual laser beam positions, obtains an offset from mutual positional relationship, calculates a correction value for correcting the optical axis shift according to an offset, and stores the calculated correction value in the memory 106e as correction information. In addition, on the basis of the signal voltages in each of the regions 102a to 102d measured by the ADC 105 received by the PD 102 by the test light emission of each of the laser light source sections 24R, 24G and 24B, the correction value calculation section 106f specifies the light output of the laser beam, calculates a correction value for correcting a difference between the light output actually projected and the expected value in accordance with the difference (shift) from the expected value, and stores the correction value in the memory 106e as correction information.

<Light Emission Control Processing>

Figure 22:
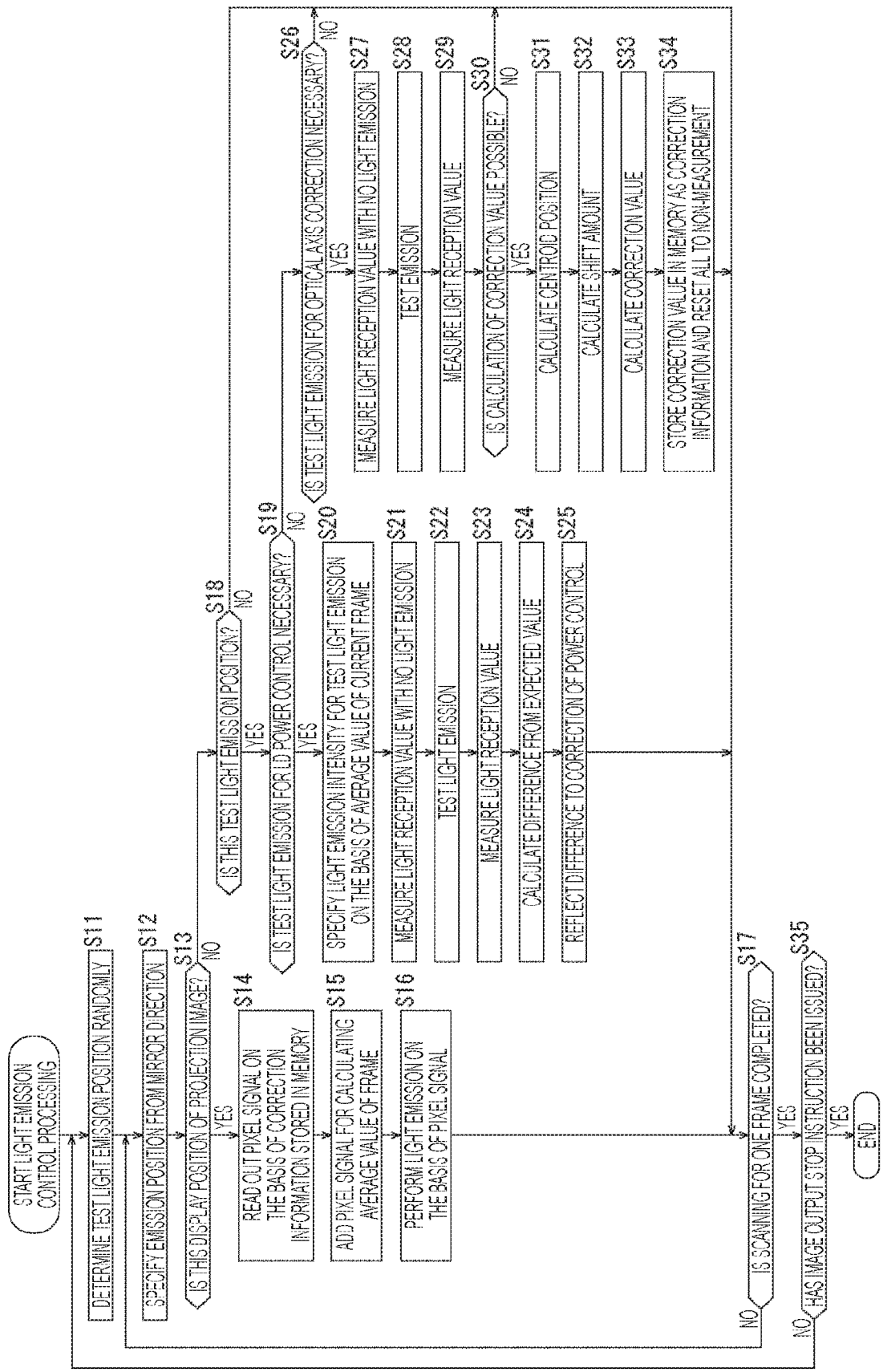
FIG. 22 is a flowchart illustrating light emission control processing in the projection apparatus in FIG. 20.

Next, light emission control processing in the projection apparatus 11 of FIG. 20 will be described with reference to a flowchart in FIG. 22.

When the input image signal is input and the projection on the screen by the raster scan corresponding to the pixel signal is started sequentially, processing starts from a state where the drive mirror 27 is inclined to a state capable of projecting at a leading portion of the scanning orbit.

Figure 23:
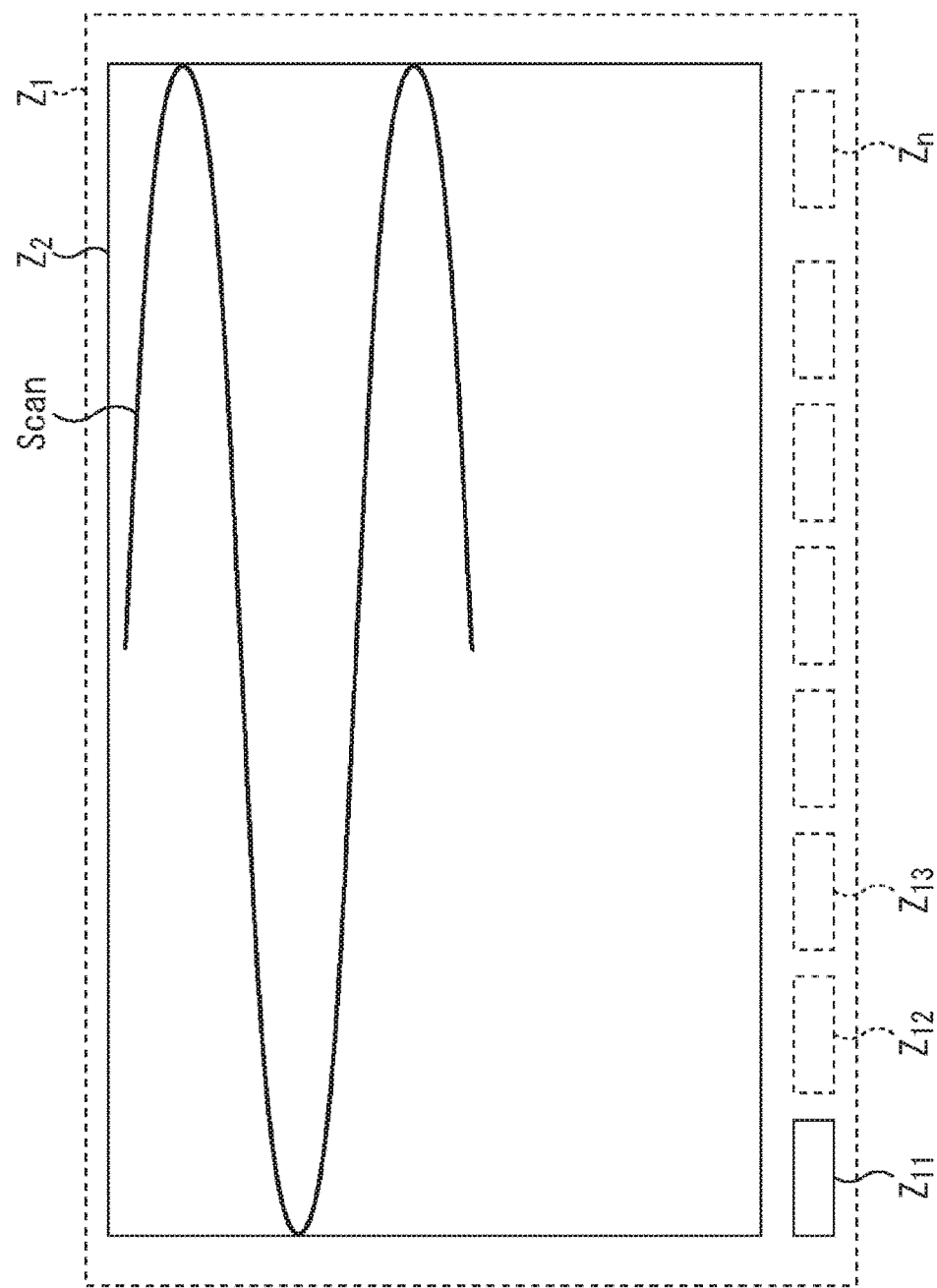
FIG. 23 is a diagram illustrating a test light emission position.

In step S11, the test light emission control section 106c randomly sets the test light emission position. The test light emission position is set to any of blanking regions around the projection image 14a by operation of the drive mirror 27. For example, as illustrated in FIG. 23, the region to be set to the test light emission position is a region around a region Z2 in which an image is actually formed among a region Z1 capable of forming the projection image 14a, and this corresponds to, for example, any of the regions Z11 to Zn. That is, the region other than the region Z2 among the region Z1 is a region unlikely to be recognized by a viewer at the time of viewing, and thus, difficult to be recognized even when light is emitted on the laser spot for tested light emission. Accordingly, for example, any of the regions Z11 to Zn is randomly set as the test light emission position.

In step S12, the test light emission control section 106c and the LD control section 106a inquires the mirror control section 106d and specifies a scanning position from the emission direction of the current drive mirror 27.

In step S13, the test light emission control section 106c determines whether the scanning position is the display region of the projection image 14a. In step S13, in a case where the scanning position is the display region of the projection image 14a, the processing proceeds to step S14.

In step S14, the LD control section 106a corrects the pixel position to be projected as an input image signal in accordance with the shift of the optical axes of the laser light source sections 24R, 24G, and 24B on the basis of the correction value stored in the memory 106e.

In step S15, the average value calculation section 106b extracts the luminance from the image signal of the corrected pixel position and adds the extracted luminance to calculate the average value of the luminance of the pixel signal of one frame.

In step S16, the LD control section 106a controls the laser driver 22 to cause the laser light source sections 24R, 24G, and 24B to emit pixel signals with pixel positions being corrected, on the basis of the input image signal.

Instep S17, the mirror control section 106d determines whether the scanning of one frame is completed, and in a case where it is not completed, the processing returns to step S12. That is, the processing of steps S12 to S34 is repeated until the processing of one frame is completed. Then, when it is determined in step S17 that the processing for one frame has been completed, the emission direction of the drive mirror 27 is changed by a predetermined angle toward the frame head position in preparation for image output of a next frame at that timing, and processing proceeds to step S35.

Moreover, in step S35, the LD control section 106a determines whether an instruction to stop image output control has been issued, and in a case where there is no instruction to stop image output control, the processing returns to step S11. Then, in a case where it is determined instep S35 that the instruction to stop image output has been issued, the processing is finished.

Meanwhile, in a case where it is determined in step S13 that the scanning position is not the display region of the projection image 14a, the processing proceeds to step S18.

In step S18, the test light emission control section 106c determines whether the scanning position specified by the inquiry to the mirror control section 106d is within the region determined as the test light emission position.

In a case where it is determined in step S18 that the specified scanning position is not within the region determined as the test light emitting position, the test light emission is not performed, and the processing proceeds to step S17.

In step S18, in a case where it is determined that it is the test light emission position, the processing proceeds to step S19.

In step S19, the LD control section 106a determines whether there is a need to execute test light emission for LD power control in any of the laser light source sections 24R, 24G, and 24B. In step S19, for example, in a case where test light emission for LD power control has not been performed within a same frame, it is determined that there is a need to execute test light emission for LD power control In such a case, the processing proceeds to step S20.

Figure 24:
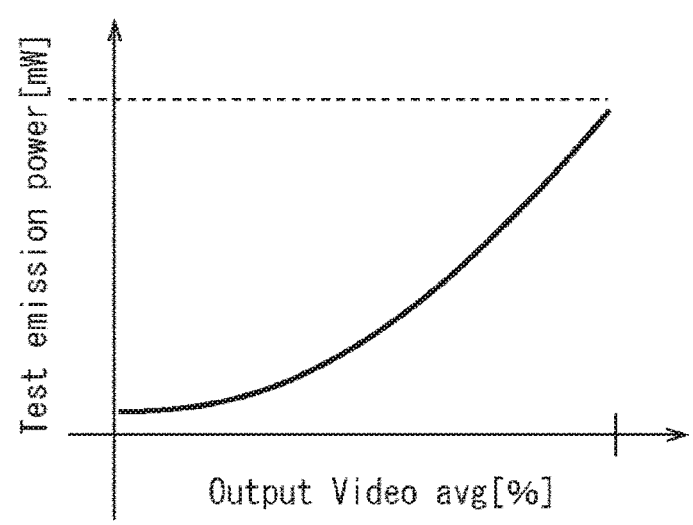
FIG. 24 is a diagram illustrating a method of setting light emission intensity of test light emission.

In step S20, the test light emission control section 106c controls the average value calculation section 106b to calculate the average value of the luminance of the pixel values within the same frame so far, and on the basis of the average value of the luminance, the test light emission control section 106c specifies the light emission intensity. That is, for example, as illustrated in FIG. 24, the test light emission control section 106c may set emission intensity in test light emission (test emission power (mV)) with respect to the average value (output video avg (%)) of luminance of pixel values within the same frame. That is, in a case where the average value of the luminance of the pixel value of the frame is low in this manner, and in the case where the image is dark as a whole, the intensity of the test light emission is set to be low and dark accordingly. Conversely, in a case where the image is bright as a whole, the intensity of the test light emission is set to be high and bright accordingly. By setting the light emission intensity in this manner, it is possible to set the brightness to a level at which occurrence of test light emission cannot be easily recognized by the user.

In step S21, the test light emission control section 106c measures a signal current in all of the regions 102a to 102d of the PD 102 as the measurement target without causing the laser light source section 24 as the measurement target to emit light in any of the laser light source sections 24R, 24G, and 24B. That is, in this case, the test light emission control section 106c sets all the switches 103a to 103d in the switching section 103 to on to enable the sum in the regions 102a to 102d as measurement targets to be measured, and controls the ADC 105 to measure the signal voltage at a corresponding timing, and then, obtains a measurement result.

In step S22, the test light emission control section 106c causes the laser light source section 24 as a measurement target to emit light.

In step S23, the test light emission control section 106c measures a signal current in all of the regions 102a to 102d of the PD 102 as the measurement target when the laser light source section 24 as the measurement target emits light in any of the laser light source sections 24R, 24G, and 24B. Also at this time, the test light emission control section 106c sets all the switches 103a to 103d in the switching section 103 to on to enable all the signal currents in the regions 102a to 102d as measurement targets to be measured, and controls the ADC 105 to measure the signal voltage at the corresponding timing, and then, obtains a measurement result.

In step S24, the correction value calculation section 106f calculates a difference between the expected value and the measurement result for the power (light output) of the laser beam when the test light emission is performed. That is, the correction value calculation section 106f calculates a correction value (correction coefficient) by thinning the offset value in the non-emission state from the measurement value of the light emission state, and by further using the difference from the expected value, and then, stores the correction value in the memory 106e.

In step S25, the LD control section 106a corrects the light emission power on the basis of the correction value (correction coefficient) obtained from the difference with the expected value stored in the memory 106e, and the processing proceeds to step S17. Hereinafter, this correction value (correction coefficient) is sequentially updated by repeating the test light emission for LD power control.

As a more specific method, for example, in the subsequent processing, the correction value calculation section 106f calculates, as a correction coefficient, a value that adds pixel signals by an amount corresponding to the difference obtained by the test light emission for LD power control, and stores the calculated value in the memory 106e. Then, the LD control section 106a reads out the correction coefficient stored in the memory 106e and adds the correction coefficient to the pixel signal in the input image signal, thereby converting it into a pixel signal capable of actually obtaining necessary power (light output) so as to be modulated and output by the laser light source section 24. With this control the power (light output) of the laser beam output by the laser light source section 24 is corrected.

By controlling the power (light output) of the laser light source section 24 in this manner, the brightness (light output) of the projection image will not become different from the expected brightness by the pixel signal, making it possible to project on the screen 14 with brightness according to the signal. As a result, the projection image 14a projected by the projection apparatus 11 achieves high image quality.

In step S19, in a case where it is determined that there is no need to execute the test light emission for the LD power control, the processing proceeds to step S26.

In step S26, the test light emission control section 106c determines whether there is a need to perform optical axis correction in any of the laser light source sections 24R, 24G, and 24B. For example, the execution or non-execution of optical axis correction is determined on the basis of whether the optical axis is corrected within a same frame, and in a case where it is determined that the optical axis correction has already been performed within the same frame, it is determined that there is no need to execute optical axis correction, and the processing proceeds to step S17.

In contrast, in a case where it is determined in step S26 that there is a need to perform optical axis correction, the processing proceeds to step S27.

In step S27, the test light emission control section 106c measures a signal current in any of the regions 102a to 102d of the PD 102 as the non-measured measurement target without causing any of the laser light source sections 24R, 24G, and 24B, that is, the laser light source section 24 as the measurement target, to emit light. That is, in this case, the test light emission control section 106c sets solely the switch among the switches 103a to 103d in the switching section 103 to on to enable any of the regions 102a to 102d as a measurement target to be measured, and controls the ADC 105 to measure the signal voltage at the corresponding timing, and then obtains a measurement result.

In step S28, the test light emission control section 106c causes the laser light source section 24 as the measurement target, that is, any of the laser light source sections 24R, 24G, and 24B, to emit light. The power of the test light emission is fixed so as to enable measurement under the same conditions in each of the measurements of the regions 102a to 102d of the PD 102. By reducing the light emission power to reduce the visibility and switching the gain of the detection system to a high gain, stable measurement can be realized. It is possible to execute measurement with the power of the test light emission having the brightness synchronized with the projection image 14a as in the processing of step S20.

In step S29, the test light emission control section 106c measures a signal current in any of the regions 102a to 102d of the PD 102 as the non-measured measurement target when the laser light source section 24 as the measurement target emits light in any of the laser light source sections 24R, 24G, and 24B. At this time, the test light emission control section 106c sets solely the switch among the switches 103a to 103d in the switching section 103 to on to enable any of the signal currents in the regions 102a to 102d as a measurement target to be measured, and controls the ADC 105 to measure the signal voltage at a corresponding timing, and then obtains a measurement result.

In step S30, the test light emission control section 106c determines whether it is possible to calculate correction values for the laser light source sections 24R, 24G, and 24B. That is, it is possible to calculate the correction values when the test light emission is performed for each of the laser light source sections 24R, 24G, and 24B and in addition to this, the measurement results for each of the regions 102a to 102d are obtained in the PD 102. Accordingly, whether the correction value can be calculated is determined on the basis of whether values having a total of 12 parameters, namely, the individual measurement results for the regions 102a to 102d of the PD 102 at the time of test light emission of each of the laser light source sections 24R, 24G and 24B.

In step S30, for example, when it is determined that it is not possible to calculate the correction value, that is, in a case where the total of 12 parameters have not been obtained, the processing proceeds to step S17.

In step S30, for example, when it is determined that it is possible to calculate the correction value, that is, in a case where the total of 12 parameters have been obtained, the processing proceeds to step S31.

In step S31, the correction value calculation section 106f calculates a centroid position of each of the laser spots of the laser light source sections 24R, 24G, and 24B on the PD 102. The shape of the laser spot on the PD 102 is known to have, for example, an elliptical shape as illustrated in the lower left portion of FIG. 21. For example, in a case where it is known that the major diameter in the ellipse at the lower left portion of FIG. 21 is By and the minor diameter is Bx, and the initial values of each of the regions 102a to 102d in the PD 102 in FIG. 21 are A to D, the centroid position (X, Y) is obtained as: $(X, Y) = (Bx \times Xoff/TTL, By \times Yoff/TTL)$. Here, Xoff is $((A+B)-(C+D))$, Yoff is $((A+D)-(B+C))$, and $TTL = A+B+C+D$.

Figure 25:
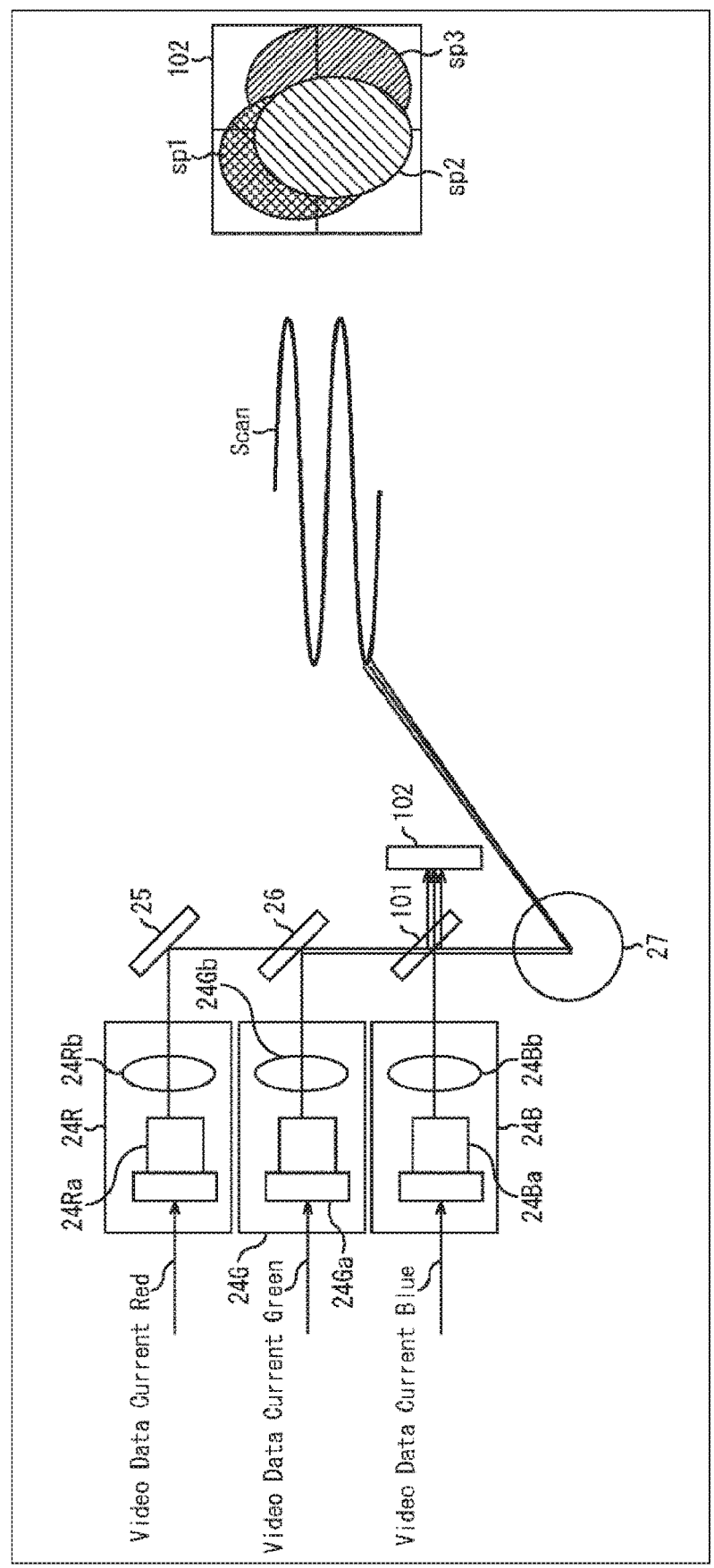
FIG. 25 is a diagram illustrating positions of laser spots on the PD at the time of test light emission of each of the laser light source sections 24R, 24G, and 24B.

For example, as illustrated in the right portion of FIG. 25, the correction value calculation section 106f calculates the above-described centroid position for each of the laser spots sp1, sp2, and sp3 on the PD 102 of the laser light source sections 24R, 24G, and 24B.

In step S32, the correction value calculation section 106f calculates differences between the past centroid positions and the present centroid positions of the laser spots sp1, sp2, and sp3 on the PD 102 of the laser light source sections 24R, 24G, and 24B. Herein, the differences to be obtained are differences $\Delta sp1$, $\Delta sp2$, and $\Delta sp3$, that is, the differences between the centroid positions of the laser spots sp1, sp2, and sp3 measured in past test light emission and the centroid position of the laser spots sp1, sp2, and sp3 measured in the current test light emission. In the first processing, however, the past centroid position of the laser spot does not exist, and thus, the differences $\Delta sp1$, $\Delta sp2$, and $\Delta sp3$ are not generated. Accordingly, the corresponding processing is skipped and processing for the second and subsequent test light emission is performed.

In step S33, the correction value calculation section 106f calculates (updates) a coefficient to be a correction value on the basis of the difference.

In step S34, the correction value calculation section 106f stores a set of correction values constituted with the obtained correction coefficients in the memory 106e as correction information.

More specifically, when the centroid positions of the laser spots sp1, sp2, and sp3 on the PD 102 of the laser light source sections 24R, 24G, and 24B are sp1 (x1, y1), sp2 (x2, y2), and sp3 (x3, y3), respectively, the correction value is obtained as follows.

That is, when the laser spot sp1 is set as an origin (0, 0), the coordinates of the laser spots sp2 and sp3 are: sp1 (0, 0), sp2 (x2-x1, y2-y1), and sp3 (x3-x1, y3-y1), respectively.

Here, the pixel positions sc1, sc2, and sc3 when the pixel position corresponding to sp1 in the projection image 14a on the screen 14 corresponding to the laser spots sp1, sp2, and sp3 on the PD 102 is set as the origin are to be: pixel positions sc1 (0, 0), sc2 (comp 2x, comp 2y), and sc3 (comp 3x, comp 3y), respectively.

Here, comp 2x is the x coordinate of the pixel position sc2 on the screen 14 projected with the laser beam of the laser spot sp2 on the PD 102, and comp 2y is the y coordinate thereof, in a similar manner. Similarly, comp 3x and comp 3y are the x and y coordinates of the pixel position sc3 on the screen 14 projected by the laser beam of the laser spot sp3 on the PD 102.

At this time, the correction values Cr, Cg, and Cb, which are the transform coefficients to the pixel positions to be projected by the laser light source sections 24R, 24G, and 24B are: Cr (0, 0), Cg (comp 2x/(x2-x1), comp 2y/(y2-y1)), and Cb (comp 3x/(x3-x1), comp 3y/(y3-y1)), respectively.

The correction values Cr, Cg, and Cb which are transform coefficients obtained in this manner are obtained as correction values in the initial processing.

Moreover, the differences $\Delta sp1$, $\Delta sp2$, and $\Delta sp3$ obtained in the above-described step S32 are obtained as follows.

Note that in the following description, the laser spots sp1', sp2', and sp3' on the PD 102 of the laser light source sections 24R, 24G, and 24B obtained by new test light emission are represented by sp1' (x1', y1'), sp2' (x2', y2'), and sp3' (x3', y3'), respectively, and the past laser spots sp1, sp2, and sp3 are represented by sp1 (x1, y1), sp2 (x2, y2), and sp3 (x3, y3), respectively.

The coordinates of the new laser spots sp1' (x1', y1'), sp2' (x2', y2'), and sp3' (x3', y3') are transformed to sp1' (0, 0), sp2' (x2'-x1', y2'-x1'), and sp3' (x3'-x1', y3'-y1') when sp1' is defined as the origin (0, 0).

By defining sp1' as a reference, the differences $\Delta sp1$, $\Delta sp2$, and $\Delta sp3$ are represented by: $\Delta sp1$ (0, 0), $\Delta sp2$ ($\Delta x2=(x2'-x1')-(x2-x1)$, $\Delta y2=(y2'-y1')-(y2-y1)$), and $\Delta sp3$ ($\Delta x3=(x3'-x1')-(x3-x1)$, $\Delta y3=(y3'-y1')-(y3-y1)$).

As a result, the correction values Cr, Cg, and Cb are updated respectively to be Cr' (0, 0), Cg' ($\Delta x$ 2×comp2x/(x2-x1), $\Delta y2$×comp 2y/(y2-y1)), Cb'($\Delta x$ 3×comp 3x/(x3-x1), $\Delta y3$×comp 3y/(y3-y1)).

Furthermore, when the pixel positions of the input image signal are (x, y) in the laser light source sections 24R, 24G, and 24B, the LD control section 106a performs correction by processing in step S15, such that when the correction values Cr, Cg, Cb are Cr (crx, cry), Cg (cgx, cgy), and Cb (cbx, cby), respectively, the pixel positions that are supposed to emit light in practice are set to be: (x, y), (x ×cgx, y×cgy) and (x×cbx, y×cby).

Through the above processing, by correcting the pixel position corresponding to the input image signal by calculating the correction values on the basis of the relationship with the centroid positions of the laser light source sections 24R, 24G, and 24B, that is, on the basis of the offset, it is possible to correct the shift of the optical axis. Furthermore, since the correction values are updated in accordance with the difference with the past position by repeatedly measuring individual centroid position of each of the optical axes of the laser light source sections 24R, 24G, and 24B, it is possible to set an appropriate correction value even in a case where there is a change, such as temperature change, in the shift of the optical axis. As a result, this makes it possible to suppress the degradation of image quality due to color bleeding, or the like caused by shifts of optical axes of the RGB laser light source sections 24R, 24G, and 24B, enabling the projection image 14a projected by the projection apparatus 11 to achieve image quality.

Figure 26:
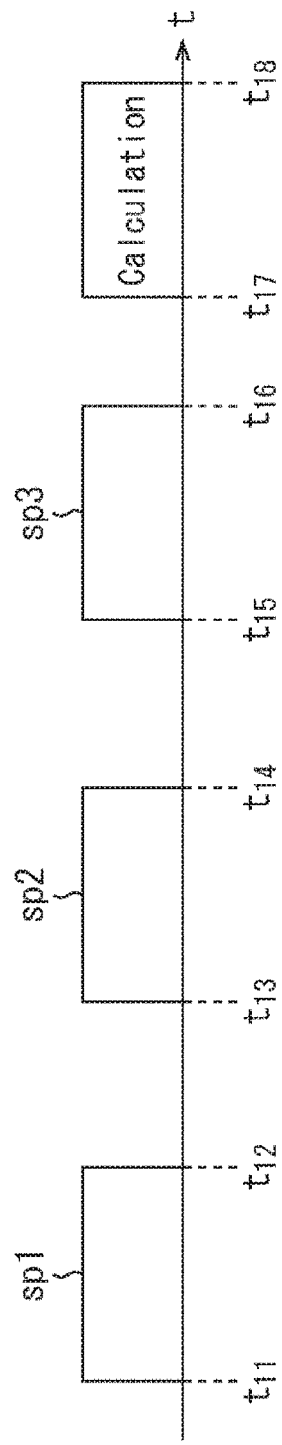
FIG. 26 is a diagram illustrating the test light emission of each of the laser light source sections 24R, 24G, and 24B and a timing of calculating a correction value.

Moreover, in this case, for example, processing is performed in a time chart as illustrated in FIG. 26. That is, the processing of steps S20 to S25 for the corresponding beam spots sp1, sp2, and sp3 in the test light emission of each of the laser light source sections 24R, 24G, and 24B is repeated in individual times including time t11 to t12, time t13 to t14, and time t15 to t16, so as to obtain measurement results for the four regions 102a to 102d in the PD 102. This enables calculation (updating) of the correction value in the time t17 to t18 by the processing of steps S26 to S29.

Figure 27:
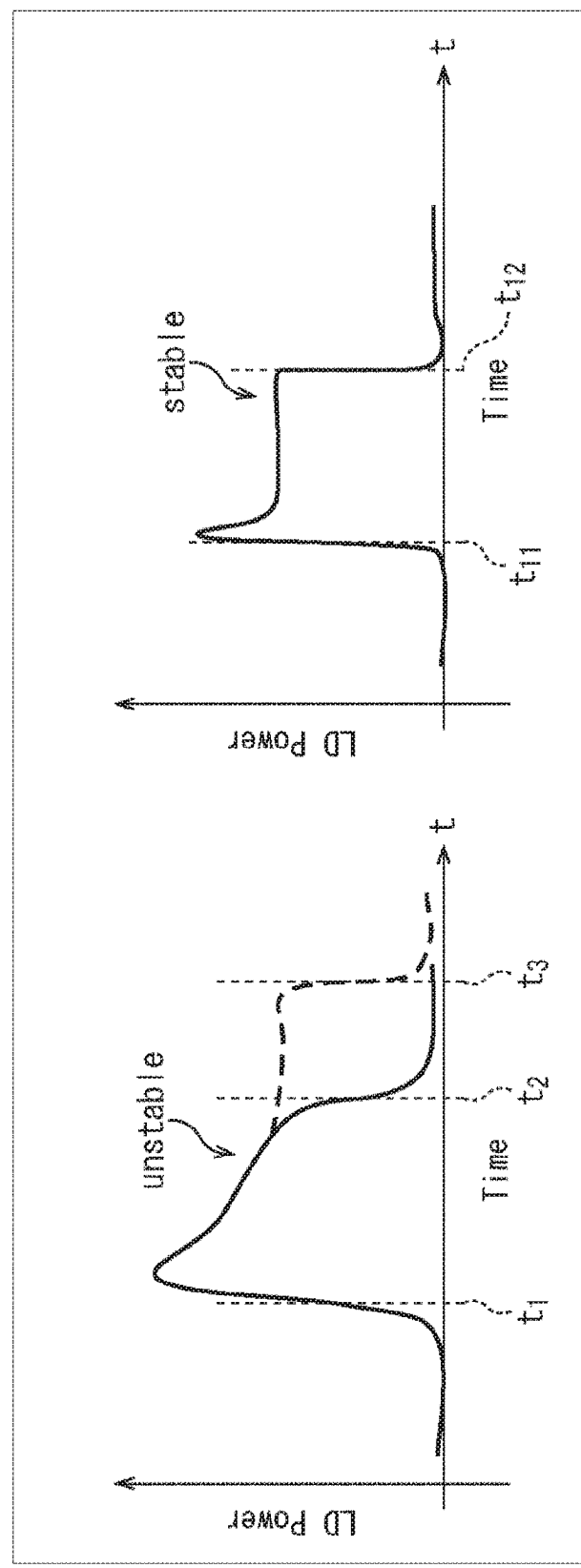
FIG. 27 is a diagram illustrating a pulse waveform of test light emission.

Furthermore, the pulse width in the light emission by the laser light source sections 24R, 24G, and 24B in the test light emission needs to be determined by the relationship between the stability of modulation of the laser beam generator 24a and a response speed in the measurement of the signal voltage corresponding to the light amount of each of the regions 102a to 102d of the PD 102. Specifically, for example, as illustrated in the left portion of FIG. 27, the pulse waveform is unstable from time t1 to t2. With such a characteristic, it would be desirable to perform measurement with a waveform having a long stable state using time t1 to t3. Note that as illustrated in the right portion of FIG. 27, time t11 to t12 which is a short time period may be used for measurement as long as the waveform is stable and measurement is possible.

While the above-described example is the case where the emission intensity in test emission is set on the basis of an average pixel value in the frame, other methods are also applicable as long as they can achieve the emission intensity unlikely to be recognized by the viewer. For example, it is allowable to change the intensity in accordance with the scene expressed by the projection image 14a. For example, the intensity may be set to relatively strong in the case of displaying fireworks set off in the night sky.

Moreover, it is allowable to set the emission intensity to a higher level for a brighter image and set it to a lower level for a darker image. Furthermore, in the case of switching test light emission in each of RGB, the test light emission value may be configured to be individually set corresponding to the output image. That is, for example, in the case of a bright green image, the test light emission intensity of green (G) may be increased, while the emission intensities of other colors of red (R) and blue (B) may be weakened. Furthermore, in consideration of the visual sensitivity of human eyes, the emission intensity may be determined solely with the green color image having the highest sensitivity. Moreover, by randomly changing the position of the test light emission, it is possible to suppress periodic repetitive light emission at a same position and to reduce the visibility of human eyes.

Moreover, there is a tendency that the higher the temperature, the greater the shifts of the optical axes become. Accordingly, it is allowable to change the frequency of occurrence of test light emission in accordance with the frequency of occurrence of the laser beam and the temperature of the laser beam generator 24a. For example, test light emission may be frequently performed in the case of high temperature, and frequency of test light emission may be lowered in the case of low temperature. Furthermore, while the exemplary configuration of the present embodiment is an exemplary case of correcting two shifts of "axis shift (misalignment)" and "shift (difference) in light output from an expected value", it would be possible to achieve high image quality in the projection image merely by correcting any of the "axis shift (misalignment)" and "shift (difference) in light output from an expected value". In order to correct solely the "shift (difference) in light output from an expected value" among these, there is no need to divide the PD 102 into four, and it is sufficient that the signal voltage corresponding to the light amount can be measured as a whole.

Moreover, while the above description is an exemplary case of the projection apparatus 11 in the projection system 1, any configuration other than the projection system 1 may be used as long as projection by the projection apparatus 11 is available. For example, the projection apparatus 11 can be used to project the projection image 14*a* on a front window of an automobile or on a head up display (HUD) used by a pilot of an aircraft, or the like.

<Exemplary Case of Execution by Software>

Meanwhile, a series of processing described above can be executed either in hardware or by software. Ina case where the series of processing is executed by software, a program constituting the software is installed from a recording medium onto a computer incorporated in dedicated hardware, or onto a general-purpose computer, for example, capable of executing various functions by installing various programs.

Figure 28:
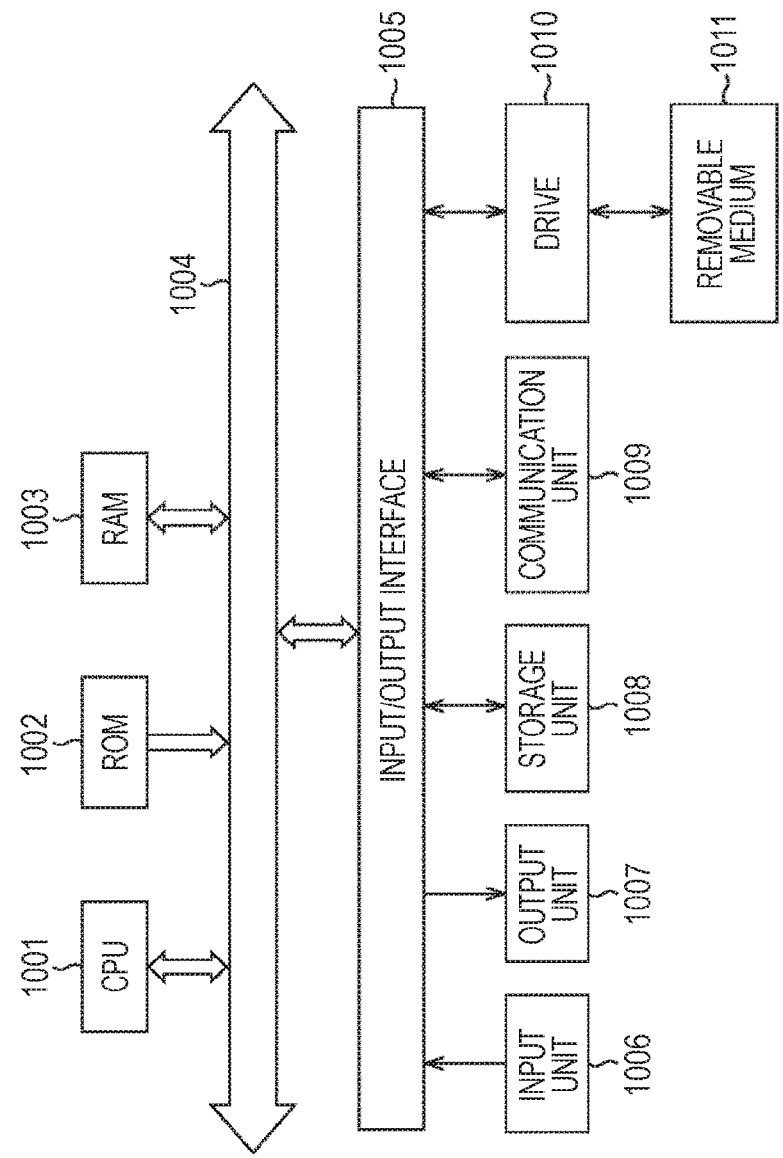
FIG. 28 is a diagram illustrating an exemplary configuration of a general-purpose personal computer.

FIG. 28 illustrates an exemplary configuration of a general-purpose personal computer. This personal computer incorporates a central processing unit (CPU) 1001. An input/output interface 1005 is coupled with the CPU 1001 via a bus 1004. A read only memory (ROM) 1002 and a random access memory (RAM) 1003 are coupled to the bus 1004.

The input/output interface 1005 is connected with an input unit 1006, an output unit 1007, a storage unit 1008, and a communication unit 1009. The input unit 1006 includes input devices such as a keyboard and a mouse used by a user to input operation commands. The output unit 1007 outputs a processing operation screen and a processing result image onto a display device. The storage unit 1008 includes a hardware disk drive for storing programs and various data. The communication unit 1009 includes a local area network (LAN) adapter and executes communication processing via a network represented by the Internet. Moreover, connection is made with a drive 1010 for reading and writing data toward a removable medium 1011 such as a magnetic disk (including a flexible disk), an optical disc (including a compact disc-read only memory (CD-ROM) and a digital versatile disc (DVD)), a magneto optical disc (including a mini disc (MD)), or a semiconductor memory.

The CPU 1001 executes various types of processing in accordance with a program stored in the ROM 1002 or a program that is read from the removable medium 1011 such as the magnetic disk, the optical disc, the magneto optical disc, or the semiconductor memory, installed in the storage unit 1008, and loaded from the storage unit 1008 to the RAM 1003. The RAM 1003 also stores data, or the like, appropriately, that are needed when the CPU 1001 executes various types of processing.

On the computer configured as above, the series of above-described processing is executed by operation such that the CPU 1001 loads, for example, a program stored in the storage unit 1008 onto the RAM 1003 via the input/output interface 1005 and the bus 1004 and executes the program.

The program executed by the computer (CPU 1001) can be stored, for example, in the removable medium 1011 as a package medium and be provided. Alternatively, the program can be provided via a wired or wireless transmission medium including a local area network, the Internet, and digital satellite broadcasting.

On the computer, the program can be installed in the storage unit 1008 via the input/output interface 1005, by attaching the removable medium 1011 to the drive 1010. In this case, the program can be received at the communication unit 1009 via a wired or wireless transmission medium and be installed in the storage unit 1008. Alternatively, the program can be installed in the ROM 1002 or the storage unit 1008 beforehand.

Note that the program executed by the computer may be a program processed in a time series in an order described in the present description, or can be a program processed in required timing such as being called.

<Example of Application to Electronic Instrument as Projection System Module>

Moreover, while the above description is an exemplary case where the projection system 1 is configured alone, the configuration of the projection system 1 excluding the screen 14 may be formed as a projection system module having a configuration of about a scale of one chip, for example, and may be incorporated into an electronic instrument such as a mobile phone, a smartphone, a mobile terminal, and a portable imaging apparatus so as to project an image stored in each of the electronic instrument or an image received by communication, for example.

Figure 29:
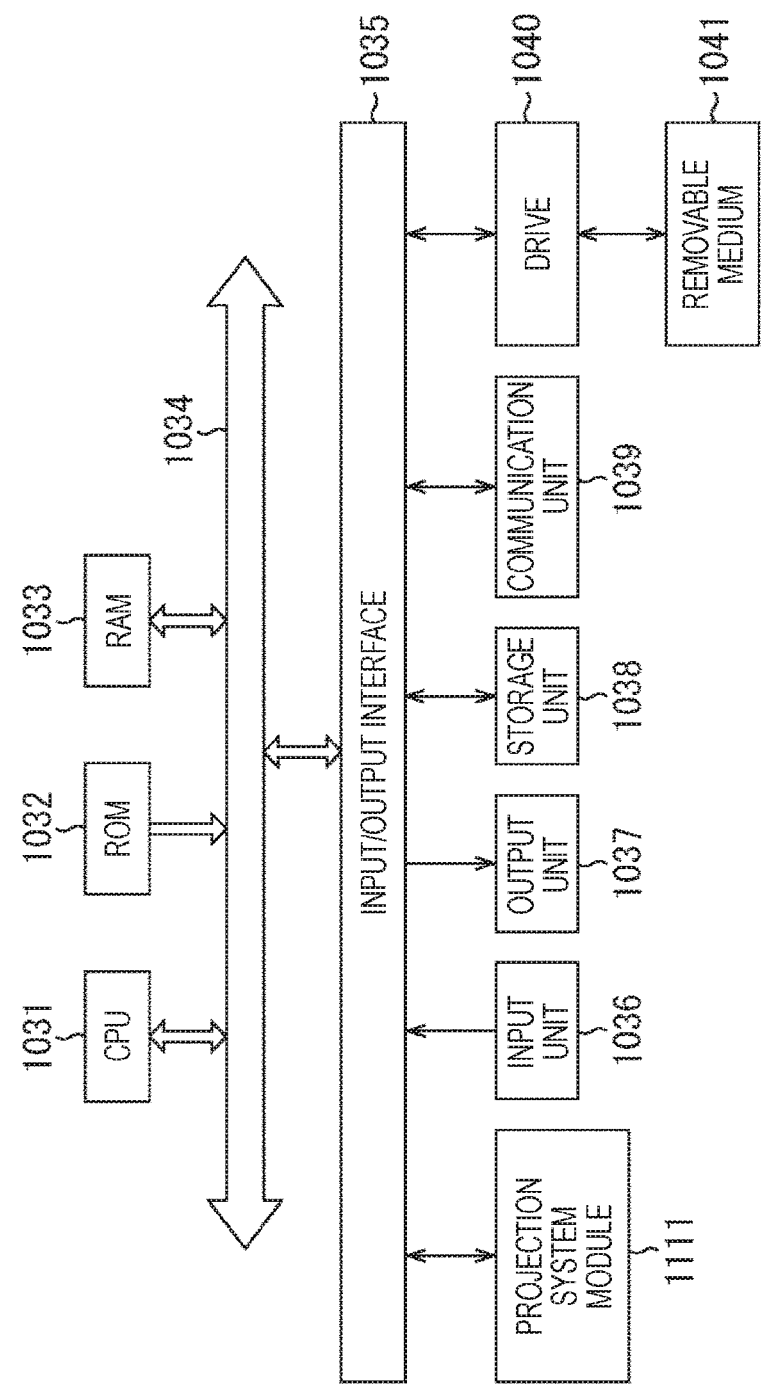
FIG. 29 is a diagram illustrating an exemplary configuration of an electronic instrument.

FIG. 29 illustrates an exemplary configuration of an electronic apparatus including a projection system module 1111 including functions as the projection system 1 except for the screen 14 in FIG. 1 as a module in one chip. Here, functions and configurations of a CPU1031 through a removable medium 1041 are substantially the same as those of the CPU1001 through the removable medium 1011, and therefore the description thereof is omitted. Still, the CPU1031 through the removable medium 1041 of the electronic instrument in FIG. 29 are formed to be more compact and to have more portability than the CPU1001 through the removable medium 1011 in typical cases. Note that since the projection system module 1111 has the same function as the projection system 1 in FIG. 1, the description thereof will be omitted.

Moreover, in the present description, the system represents a set of multiple constituents (devices, modules (parts), or the like). In other words, all the constituents may be in a same housing but they do not have to be in the same housing. Accordingly, a plurality of apparatuses, housed in separate housings, connected via a network can be a system. An apparatus in which a plurality of modules is housed in one housing can also be a system.

Note that embodiments of the present technology are not limited to the above-described embodiments but can be modified in a variety of ways within a scope of the present technology.

For example, the present technology can be configured as a form of cloud computing in which one function is shared in cooperation for processing among a plurality of apparatuses via a network.

Moreover, each of steps described in the above flowcharts can be executed on one apparatus or shared by a plurality of apparatuses for processing.

Furthermore, in a case where one step includes a plurality of stages of processing, the plurality of stages of processing included in the one step can be executed on one apparatus or can be shared by a plurality of apparatuses.

Note that the present technology may also be configured as below.

<1> A projecting apparatus including: a light source unit including a plurality of light sources each configured to emit a laser beam; and a scanning section configured to reflect the plurality of laser beams generated by the plurality of light sources of the light source unit and to project the laser beams on a screen while scanning the laser beams, in which the plurality of light sources is provided in a shifted state so as to allow the laser beams generated by the plurality of light sources to form different scanning light paths on the screen, and the individually shifted laser beams are modulated with individually different image signals.

<2> The projecting apparatus according to <1>, in which the scanning section reflects the plurality of laser beams generated by the light source and scans over the screen in a vertical direction by raster scan, and in a case where the number of the plurality of light sources is N, and when the plurality of light sources allows the plurality of laser beams generated in each of the light sources to be reflected by the scanning section to be projected on the screen, the laser beam is projected in a state of being shifted by (m+1/N) lines in a vertical direction on the screen, and in a case where the number of the light sources is one and the number of lines in the horizontal direction capable of scanning over the screen is Vline_single, the m is set to a value smaller than Vline_single×(1−1/N).

<3> The projecting apparatus according to <2>, in which the light source unit includes: a plurality of laser beam generators configured to generate a laser beam;

a collimator lens configured to substantially collimate the plurality of laser beams generated by the plurality of laser beam generators; and an optical block configured to project the plurality of laser beams reflected by the scanning section and scanned, on the screen, and when an shift amount of an optical axis of the laser beams of the plurality of laser beam generators is d, an optical magnification by the optical block and the collimator lens is Mt, and a line interval in the vertical direction when N laser beams of a same color are scanned over the screen is Vline_step, then, d=(m+1/N)/Mt×Vline_step.

<4> The projecting apparatus according to <2>, in which the plurality of light sources is arranged to have a shift of the plurality of light sources being fixed such that a plurality of laser beam is shifted by 1/N times when the plurality of laser beams generated by the plurality of light sources is reflected by the scanning section and projected on the screen, with respect to the line interval in the vertical direction when the same laser beams are scanned over the screen.

<5> The projecting apparatus according to <2>, in which the plurality of light sources is a monolithic multi-beam laser diode (LD).

<6> The projecting apparatus according to any one of <1> to <5>, in which the light source unit is provided for each of RGB in the image signal.

<7> A projecting module including:

a light source unit including a plurality of light sources each configured to emit a laser beam; and a scanning section configured to reflect the plurality of laser beams generated by the plurality of light sources of the light source unit and to project the laser beams on a screen while scanning the laser beams, in which the plurality of light sources is provided in a shifted state so as to allow the laser beams generated by the plurality of light sources to form different scanning light paths on the screen, and the individually shifted laser beams are modulated with individually different image signals.

<8> An electronic instrument including:

a light source unit including a plurality of light sources each configured to emit a laser beam; and a scanning section configured to reflect the plurality of laser beams generated by the plurality of light sources of the light source unit and to project the laser beams on a screen while scanning the laser beams, in which the plurality of light sources is provided in a shifted state so as to allow the laser beams generated by the plurality of light sources to form different scanning light paths on the screen, and the individually shifted laser beams are modulated with individually different image signals.

REFERENCE SIGNS LIST

1 Projection system
11 Projection apparatus
12 Host controller
13 Distance measurement section
14 Screen
14a Projection image
21 Controller
22 Laser driver
23 Mirror driver
24R, 24G, 24B Laser light source section
24a, 24Ra, 24Ga, 24Ba Laser beam generator
24b, 24Rb, 24Gb, 24Bb Collimator lens
25 Mirror
26-1, 26-2 Dichroic mirror
27 Drive mirror
28 Optical lens
101 Beam splitter
102 Photodetector (PD)
102a to 102d Region
103 Switching section
103a to 103d switch
104 TIA (Trance Impedance Amplifier)
105 ADC (Analog Digital Converter)
106 Controller
106a LD control section
106b An average value calculation section
106c Test light emission control section
106d Mirror control section
106e Memory
106f Correction value calculation section

The invention claimed is:

1. A projecting apparatus comprising:
   a light source unit including a plurality of light sources each configured to emit a laser beam; and
   a scanning section configured to reflect the plurality of laser beams generated by the plurality of light sources of the light source unit and to project the laser beams on a screen while scanning the laser beams,
   wherein the laser beams are respectively shifted such that the laser beams generated by the plurality of light sources form different but respectively adjacent scanning light paths on the screen, wherein adjacent instances of the laser beams have an interval that suppresses excessive overlapping with each other in a vertical direction and prevents a gap in the vertical direction from exceeding a predetermined interval,
   wherein the individually shifted laser beams are modulated with individually different image signals, wherein the scanning section reflects the plurality of laser beams generated by the light source and scans over the screen in the vertical direction by raster scan, and wherein a variable m denotes a vertical scanning line interval coefficient for adjusting the interval between the vertical scanning lines, a variable N denotes the number of the plurality of light sources, and when the plurality of light sources allows the plurality of laser beams generated in each of the light sources to be reflected by the scanning section to be projected on the screen, the shifting of adjacent instances of the laser beams is (m+1/N) lines in the vertical direction on the screen.

2. The projection apparatus according to claim 1, wherein the light source unit includes:

a plurality of laser beam generators configured to generate a laser beam;

a collimator lens configured to substantially collimate the plurality of laser beams generated by the plurality of laser beam generators; and an optical block configured to project the plurality of laser beams reflected by the scanning section and scanned, on the screen, and when an shift amount of an optical axis of the laser beams of the plurality of laser beam generators is d, an optical magnification by the optical block and the collimator lens is Mt, and a line interval in the vertical direction when N laser beams of a same color are scanned over the screen is Vline_step, then, $d=(m+1/N)/Mt \times Vline\_step$.

3. The projection apparatus according to claim 1, wherein the plurality of light sources is arranged to have a shift of the plurality of light sources being fixed such that a plurality of laser beam is shifted by 1/N times when the plurality of laser beams generated by the plurality of light sources is reflected by the scanning section and projected on the screen, with respect to the line interval in the vertical direction when the same laser beams are scanned over the screen.

4. The projection apparatus according to claim 1, wherein the plurality of light sources is a monolithic multi-beam laser diode (LD).

5. The projection apparatus according to claim 1, wherein the light source unit is provided for each of RGB in the image signal.

6. A projecting module comprising:

a light source unit including a plurality of light sources each configured to emit a laser beam; and a scanning section configured to reflect the plurality of laser beams generated by the plurality of light sources of the light source unit and to project the laser beams on a screen while scanning the laser beams, wherein the laser beams are respectively shifted such that the laser beams generated by the plurality of light sources form different but respectively adjacent scanning light paths on the screen, wherein adjacent instances of the laser beams have an interval that suppresses excessive overlapping with each other in a vertical direction and prevents a gap in the vertical direction from exceeding a predetermined interval, wherein the individually shifted laser beams are modulated with individually different image signals, wherein the scanning section reflects the plurality of laser beams generated by the light source and scans over the screen in the vertical direction by raster scan, and wherein a variable m denotes a vertical scanning line interval coefficient for adjusting the interval between the vertical scanning lines, a variable N denotes the number of the plurality of light sources, and when the plurality of light sources allows the plurality of laser beams generated in each of the light sources to be reflected by the scanning section to be projected on the screen, the shifting of adjacent instances of the laser beams is (m+1/N) lines in the vertical direction on the screen.

7. The projecting module according to claim 6, wherein the light source unit includes:

a plurality of laser beam generators configured to generate a laser beam;

a collimator lens configured to substantially collimate the plurality of laser beams generated by the plurality of laser beam generators; and an optical block configured to project the plurality of laser beams reflected by the scanning section and scanned, on the screen, and when an shift amount of an optical axis of the laser beams of the plurality of laser beam generators is d, an optical magnification by the optical block and the collimator lens is Mt, and a line interval in the vertical direction when N laser beams of a same color are scanned over the screen is Vline_step, then, $d=(m+1/N)/Mt \times Vline\_step$.

8. The projecting module according to claim 6, wherein the plurality of light sources is arranged to have a shift of the plurality of light sources being fixed such that a plurality of laser beam is shifted by 1/N times when the plurality of laser beams generated by the plurality of light sources is reflected by the scanning section and projected on the screen, with respect to the line interval in the vertical direction when the same laser beams are scanned over the screen.

9. The projecting module according to claim 6, wherein the plurality of light sources is a monolithic multi-beam laser diode (LD).

10. The projecting module according to claim 6, wherein the light source unit is provided for each of RGB in the image signal.

11. An electronic instrument comprising:

a light source unit including a plurality of light sources each configured to emit a laser beam; and a scanning section configured to reflect the plurality of laser beams generated by the plurality of light sources of the light source unit and to project the laser beams on a screen while scanning the laser beams, wherein the laser beams are respectively shifted such that the laser beams generated by the plurality of light sources form different but respectively adjacent scanning light paths on the screen, wherein adjacent instances of the laser beams have an interval that suppresses excessive overlapping with each other in a vertical direction and prevents a gap in the vertical direction from exceeding a predetermined interval, wherein the individually shifted laser beams are modulated with individually different image signals, wherein the scanning section reflects the plurality of laser beams generated by the light source and scans over the screen in the vertical direction by raster scan, and wherein a variable m denotes a vertical scanning line interval coefficient for adjusting the interval between the vertical scanning lines, a variable N denotes the number of the plurality of light sources, and when the plurality of light sources allows the plurality of laser beams generated in each of the light sources to be reflected by the scanning section to be projected on the screen, the shifting of adjacent instances of the laser beams is (m+1/N) lines in the vertical direction on the screen.

12. The electronic instrument according to claim 11, wherein the light source unit includes:
a plurality of laser beam generators configured to generate a laser beam;
a collimator lens configured to substantially collimate the plurality of laser beams generated by the plurality of laser beam generators; and
an optical block configured to project the plurality of laser beams reflected by the scanning section and scanned, on the screen, and
when an shift amount of an optical axis of the laser beams of the plurality of laser beam generators is d, an optical magnification by the optical block and the collimator lens is Mt, and a line interval in the vertical direction when N laser beams of a same color are scanned over the screen is Vline_step, then, d=(m+1/N)/Mt×Vline_step.

13. The electronic instrument according to claim 11 wherein the plurality of light sources is arranged to have a shift of the plurality of light sources being fixed such that a plurality of laser beam is shifted by 1/N times when the plurality of laser beams generated by the plurality of light sources is reflected by the scanning section and projected on the screen, with respect to the line interval in the vertical direction when the same laser beams are scanned over the screen.

14. The electronic instrument according to claim 11, wherein the plurality of light sources is a monolithic multi-beam laser diode (LD).

15. The electronic instrument according to claim 11, wherein the light source unit is provided for each of RGB in the image signal.

* * * * *